(12) United States Patent
Krause et al.

(10) Patent No.: US 7,864,808 B2
(45) Date of Patent: *Jan. 4, 2011

(54) ADVANCED, SELF-BALANCING VIDEO MULTIPLEXER SYSTEM

(75) Inventors: Edward A. Krause, Saratoga, CA (US); Peter Monta, Palo Alto, CA (US); Adam Tom, San Francisco, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/319,629

(22) Filed: Jan. 8, 2009

(65) Prior Publication Data

US 2009/0138966 A1 May 28, 2009

Related U.S. Application Data

(60) Division of application No. 11/123,677, filed on May 6, 2005, which is a continuation of application No. PCT/US2004/028031, filed on Aug. 27, 2004.

(60) Provisional application No. 60/499,043, filed on Aug. 29, 2003.

(51) Int. Cl.
*H04H 20/28* (2008.01)

(52) U.S. Cl. ........................ 370/486; 370/485

(58) Field of Classification Search ................ 370/431, 370/437, 464, 485–487; 725/25, 31, 86–87, 725/91–95, 104–105, 109, 111, 114–117, 725/143–147; 709/227–229; 380/200, 210, 380/212; 713/150, 168, 176

See application file for complete search history.

(56) References Cited

U.S. PATENT DOCUMENTS 5,216,503 A  6/1993  Paik et al.

(Continued)

FOREIGN PATENT DOCUMENTS

EP   0 698 999   2/1996

(Continued)

OTHER PUBLICATIONS

Dontharaju, et al. "A Design Automation and Power Estimation Flow for RFID Systems", ACM Transactions on Design Automation of Electronic Systems, vol. 14, No. 1, Article 7, pp. 1-31, Jan. 2009.

(Continued)

*Primary Examiner*—Aung S Moe
*Assistant Examiner*—Feben Haile
(74) *Attorney, Agent, or Firm*—Lipsitz & McAllister, LLC

(57) ABSTRACT

An advanced video multiplexer system designed and optimized for next generation on-demand video distribution is described. The system optimizes identifies a multi-program transport stream best able to accommodate new sessions based upon Quality of Service (QoS) and QAM utilization ratios. MPTS channels are rebalanced via re-grouping and transrating as necessary to optimize bandwidth utilization. Multiple video formats are supported via built-in transcoding. The multiplexer manages encryption resources and supports new sessions using previously allocated encryption resources where possible. Sessions can be grouped into encryption channels either by using a single authorization tier per channel policy, or by requiring all clients of the group to be in physically separated service groups. Encryption channels can be released when a channel no longer serves any clients or when one or more other channels that have been assigned the same entitlement can accommodate any remaining clients.

14 Claims, 11 Drawing Sheets

U.S. PATENT DOCUMENTS

| | | | |
|---|---|---|---|
| 5,606,359 | A | 2/1997 | Youden et al. |
| 5,621,728 | A | 4/1997 | Lightfoot et al. |
| 5,732,068 | A | 3/1998 | Takahashi et al. |
| 5,825,829 | A | 10/1998 | Borazjani et al. |
| 5,844,890 | A | 12/1998 | Delp et al. |
| 5,862,140 | A | 1/1999 | Shen et al. |
| 5,892,535 | A | 4/1999 | Allen et al. |
| 5,917,830 | A | 6/1999 | Chen et al. |
| 5,926,205 | A | 7/1999 | Krause et al. |
| 5,973,722 | A | 10/1999 | Wakai et al. |
| 6,029,045 | A | 2/2000 | Picco et al. |
| 6,134,225 | A | 10/2000 | Pham et al. |
| 6,137,493 | A | 10/2000 | Kamimura et al. |
| 6,141,693 | A | 10/2000 | Perlman et al. |
| 6,154,206 | A | 11/2000 | Ludtke |
| 6,215,767 | B1 | 4/2001 | Li |
| 6,229,895 | B1 | 5/2001 | Son et al. |
| 6,317,409 | B1 | 11/2001 | Murakami |
| 6,430,228 | B1 | 8/2002 | Zhang |
| 6,434,141 | B1 | 8/2002 | Oz et al. |
| 6,434,197 | B1 | 8/2002 | Wang et al. |
| 6,452,924 | B1 | 9/2002 | Golden et al. |
| 6,490,250 | B1 | 12/2002 | Hinchley et al. |
| 6,510,519 | B2 | 1/2003 | Wasilewski et al. |
| 6,546,055 | B1 | 4/2003 | Schmidl et al. |
| 6,578,201 | B1 | 6/2003 | LaRocca et al. |
| 6,590,871 | B1 | 7/2003 | Adachi |
| 6,678,318 | B1 | 1/2004 | Lai |
| 6,687,307 | B1 | 2/2004 | Anikhindi et al. |
| 6,728,270 | B1 | 4/2004 | Meggers et al. |
| 6,754,241 | B1 | 6/2004 | Krishnamurthy |
| 6,871,011 | B1 | 3/2005 | Rahman et al. |
| 6,898,285 | B1 | 5/2005 | Hutchings et al. |
| 6,904,610 | B1 | 6/2005 | Bayrakeri et al. |
| 6,928,120 | B1 | 8/2005 | Zhang |
| 6,934,965 | B2 | 8/2005 | Gordon et al. |
| 6,954,505 | B2 | 10/2005 | Gatherer et al. |
| 6,996,129 | B2 | 2/2006 | Krause et al. |
| 7,124,424 | B2 | 10/2006 | Gordon et al. |
| 7,146,628 | B1 | 12/2006 | Gordon et al. |
| 7,242,773 | B2 | 7/2007 | Candelore |
| 7,337,320 | B2 | 2/2008 | Tada et al. |
| 7,448,063 | B2 | 11/2008 | Freeman et al. |
| 2001/0009574 | A1 | 7/2001 | Iemura |
| 2002/0053078 | A1 | 5/2002 | Holtz et al. |
| 2002/0059623 | A1 | 5/2002 | Rodriguez et al. |
| 2002/0078440 | A1 | 6/2002 | Feinberg et al. |
| 2002/0080887 | A1 | 6/2002 | Jeong et al. |
| 2002/0122387 | A1 | 9/2002 | Ni |
| 2002/0150115 | A1 | 10/2002 | Onvural et al. |
| 2002/0165983 | A1 | 11/2002 | Gastaldi |
| 2002/0196850 | A1 | 12/2002 | Liu et al. |
| 2003/0056217 | A1 | 3/2003 | Brooks |
| 2003/0118134 | A1 | 6/2003 | Harris |
| 2003/0123657 | A1 | 7/2003 | Bjordammen et al. |
| 2003/0142689 | A1 | 7/2003 | Haberman et al. |
| 2003/0182429 | A1 | 9/2003 | Jagels |
| 2003/0219026 | A1 | 11/2003 | Sun et al. |
| 2003/0233464 | A1 | 12/2003 | Walpole et al. |
| 2004/0081205 | A1 | 4/2004 | Coulson |
| 2004/0181811 | A1 | 9/2004 | Rakib |
| 2004/0258174 | A1 | 12/2004 | Shao et al. |
| 2005/0169395 | A1 | 8/2005 | Monta |
| 2005/0289619 | A1 | 12/2005 | Melby |
| 2008/0025389 | A1 | 1/2008 | Markman et al. |

FOREIGN PATENT DOCUMENTS

| | | |
|---|---|---|
| EP | 0 772 316 | 5/1997 |
| EP | 1 056 250 | 11/2000 |
| EP | 2026558 | 2/2009 |
| JP | 11098128 | 4/1999 |
| JP | 11225168 | 8/1999 |
| JP | 2002319971 | 10/2002 |
| WO | 94/21061 | 9/1994 |
| WO | 96/37062 | 11/1996 |
| WO | 97/39584 | 10/1997 |
| WO | 99/14955 | 3/1999 |
| WO | 03/065642 | 8/2003 |
| WO | 2004/079978 | 9/2004 |
| WO | 2004/095793 | 11/2004 |
| WO | 2004/095825 | 11/2004 |
| WO | 2005/022795 | 3/2005 |
| WO | 2005/022796 | 3/2005 |
| WO | 2005/022892 | 3/2005 |

OTHER PUBLICATIONS

Hairuo Ma, Magda El Zarki; A New Transport Protocol for Broadcasting/Multicasting MPEG-2 Video Over Wireless ATM Access Networks, Jul. 2002, Wireless Networks, vol. 8 Issue 4, pp. 371-380.

Peter Schojer, et al., Architecture of a Quality Based Intelligent Proxy (QBIX) for MPEG-4 Videos, May 2003, Proceedings of the 12th international conference on World Wide Web, pp. 394-402.

John L. Hennessy et al., Computer Architecture: A Quantitative Approach, Third Edition, Ch. 5., Morgan Kaufmann, Hardcover, 3$^{rd}$ edition, Published May 2002, 1100 pages, ISBN 1558605967, pp. 460-489.

Yao ZuoHua, "The Application of the Scrambling and Descrambling System", Community Antenna Television of China, the 2nd period, 2001 (2 pages).

Brassil, J., et al., "Enhancing Internet Streaming Media with Cueing Protocols," IEEE Infocom 2001, vol. 1, Apr. 22, 2001, pp. 95-103, XP010538689.

Kifle, Muli et al., "An OFDM System Using Polyphase Filter and DFT Architecture for Very High Data Rate Applications," NASA/TM-2001-210813, May 2001, 18 pages.

ADVANCED, SELF-BALANCING VIDEO MULTIPLEXER SYSTEM

CROSS-REFERENCE TO RELATED APPLICATIONS

This application is a divisional of U.S. patent application Ser. No. 11/123,677 filed on May 6, 2005, which is incorporated herein by reference.

U.S. application Ser. No. 11/123,677 filed May 6, 2005 is a continuation of International Application No. PCT/US2004/028031 filed Aug. 27, 2004, which claims the benefit of U.S. Provisional Application No. 60/499,043 filed Aug. 29, 2003.

This application relates to co pending International Application No. PCT/US 2004/028093 filed on Aug. 27, 2004, which is incorporated herein by reference.

This application further relates to copending International Application No. PCT/US 2004/028155 filed on Aug. 27, 2004, which is incorporated herein by reference.

TECHNICAL FIELD OF THE INVENTION

The present invention relates to video multiplexing systems, and more particularly to video multiplexing systems for digital cable television distribution.

BACKGROUND

Over the last several years, there has been considerable growth in the availability of digital cable and satellite television broadcasting. As demand for digital programming continues to grow, cable television providers are transitioning from analog cable transmission systems and converters to mixed analog/digital and all-digital cable distribution systems.

Increasing competition from digital satellite service providers has contributed to increased demand for more and different digital cable services including digital data services, interactive programming services and "on-demand" services like video-on-demand (VOD). A high-end variant of VOD, "everything-on-demand" (EOD) offers a dedicated, full-time video and audio stream for every user. An EOD stream can be used to view time-shifted TV, movies, or other content stored by content providers at the headend of the network, with full VCR-like controls such as pause, fast forward, random access with "bookmarks", etc.

In combination with other services like interactive programming, cable Internet services, etc., these per-user services require considerably more infrastructure than do pure broadcast services. These newer, high-end services require a server subsystem to provide dynamically customized multi-program multiplexes on a per-user basis. Clearly, this requires a great deal of high-speed, high-performance processing, data routing, encoding and multiplexing hardware that would not otherwise be required.

As demand continues to grow for these high-end, per-user services, there is a growing need for more efficient, more cost-effective methods of creating large numbers of custom program multiplexes.

Television signals are commonly delivered to the home using distribution systems based on coaxial cable, twisted-pair telephone wires, optical fiber, or wireless terrestrial or satellite transmissions. In many cases, programming is made available at no cost to the viewer, and instead the content providers and the content distributors are indirectly compensated based on revenues raised from advertising. In other cases, content is made available without advertisements, and in such cases, compensation is based on alternative sources of funding such as donations, or subscription and pay-per-view fees that are paid by the viewer. Today, viewer fees are usually charged for premium programming, however, in the future, fees may also be charged for general programming if such content can be delivered on-demand.

The delivery of on-demand programming is controlled by the viewer. Specifically, the viewer may be provided with the ability to select a program, begin playback at any time, pause and resume playback, reverse the direction of playback, speed up and slow down playback, or jump to any desired location in the program. One consequence of offering on-demand programming is that it enables the viewer to avoid viewing the advertisements that may have been inserted into a program, either by increasing the playback rate or jumping further forward into the program. This can become problematic if relatively large numbers of viewers are equipped with on-demand capabilities and the content owners are deriving their compensation from revenues that originate from the advertisers. Possible solutions to this potential problem include imposing restrictions on the level of control that is made available to the viewer, switching to a targeted or addressable advertising model which may be better tuned to the interests of each particular viewer, or levying a fee on the viewer in return for programming that is advertisement free.

Any time a fee is charged to the public, either to receive premium content, or to receive programming on-demand, it is important to provide mechanisms to prevent unauthorized access to content delivered over publicly accessible infrastructure. Access control is also important to limit the viewing of content that is confidential, sensitive in nature, or deemed unsuitable for the general public for other reasons. The solution that has been adopted by the television industry is to deploy Conditional Access (CA) systems. Most CA systems use digital encryption and are based on ciphers that encode and "randomize" the video and audio signals. Such randomized signals can be restored only through the application of special keys to the cipher modules. Such keys are usually protected and/or encrypted using ciphers that are even more secure than those applied to the signal itself. Typically, such encrypted keys are embedded into the television signal in messages known as ECMs (Entitlement Control Messages). During the presentation of a program, the keys are often changed on a regular basis and are only decodable once a viewer has been granted access to the encrypted program or to a programming class that is associated with a particular encrypted program. Such classes of programs are known as encryption tiers. Individual viewers can be granted access to selected encryption tiers through the use of messages known as EMMs (Entitlement Management Messages). EMMs are transmitted on a relatively infrequent basis, or whenever a change in entitlement occurs, and may be decodable only by the intended viewer. The EMMs include the information that is needed to interpret the ECMs corresponding to one or more encryption tiers.

Encryption equipment for television signals is deployed in cable head-ends, satellite uplink centers, and other sites where television signals are distributed. Such equipment is manufactured and maintained by a relatively small number of vendors, and is usually based on closely guarded proprietary technology. This protection of information helps to insure that a system is not compromised and continues to resist unauthorized attempts to access encrypted programming. Unfortunately, by limiting the number of vendors that have access to this market, it becomes more difficult to introduce technological innovations and a barrier is created for new entrants seeking to enter this market with more efficient products. For instance, hardware in a cable head-end may include satellite demodulation and decryption systems, video servers, multiplexers, transcoders, encryptors, and modulators. The ability to deliver on-demand capabilities at a cost that the head-end operator can afford depends on the ability of vendors to offer such equipment at prices that are significantly lower than they are today. Unfortunately, this may not be possible if the cost of the encryption and decryption components remains high, or if these components continue to be manufactured in low density enclosures and are not integrated with other head-end equipment.

SUMMARY OF THE INVENTION

The present inventive technique provides an advanced video multiplexer system capable of accommodating disparate digital video streams and formats. Multiple video formats can be accommodated simultaneously, (e.g., MPEG-4/Part 10 and MPEG-2), and video streams can be transrated and/or converted back and forth between CBR (Constant Bit Rate) encoding and VBR (Variable Bit Rate) encoding to accommodate specific bandwidth assignment issues. By managing assignment of and multiplexing of video streams to MPTSs (Multi Program Transport Streams) the present inventive technique accommodates automatic self-balancing of its MPTSs, ensuring optimum or near-optimum resource and channel bandwidth utilization.

According to the invention, such a video multiplexer system comprises a session manager, a video server, a multiplexer, an encrypter and at least one transrating module. The session manage establishes digital video sessions with a plurality of client devices (typically set-top boxes), and identifies digital video content to be provided to those client devices and how that content is to be authorized and encrypted. Authorization (e.g., of Pay-Per-View, Subscription or On-Demand services) can be coordinated with a purchase server, if necessary. The digital video content is provided by the video server and, as necessary, other sources (e.g., satellite receiver, locally generated video stream, etc.). The video server is responds to session manager requests for video content and provides such digital video content (typically from disk storage). The video content typically consists of a plurality of video segments. The multiplexer selects and combines video program content provided by the video server (and other sources, as applicable) into one or more multichannel multiplexes, transrating and/or transcoding as necessary to match specific client video format requirements and to accommodate channel bandwidth and/or utilization requirements. The encrypter encrypts video content according to encryption parameters associated with authorization information for the provided video content. Encryption channels, each encrypting according to a specific set of encryption parameters (associated with an authorization tier), are set up as required by the session manager at the time of session initialization. The transrating module converts digital video stream data directed to it by the multiplexer to a different (typically lower or equal) bit rate, and can convert back and forth between CBR and VBR encoding.

According to an aspect of the invention, when a new session is established by the session manager, the multiplexer determines MPTS occupancy levels and routes digital video content associated with said new session to an MPTS best able to accommodate said session according to predetermined occupancy criteria. The occupancy criteria can include such parameters are synchronization tolerances, QoS (Quality of Service) requirements and/or QAM utilization ratios.

According to another aspect of the invention, when new sessions are established, the multiplexer automatically reorganizes routing of video content associated with previous sessions along with the content of the new sessions to balance MPTS occupancy.

According to another aspect of the invention, the multiplexer transrates CBR encoded digital video content via the transrating module, converting it to VBR encoding at a bit rate consistent with QAM channel capacity.

The present inventive video multiplexer system is compatible with satellite broadcast services. Typically, satellite broadcasts are transmitted as statistically multiplexed VBR streams. By means of its transrating capability, the present inventive multiplexer can selectively decode and transrate all or a portion of digital video content received from a satellite receiver to match any transport stream encoding/bit-rate requirements.

Because of its ability to transrate any video content, the present inventive multiplexer system has great flexibility in merging streams from multiple sources, and in combination with its ability to effect rapid switching (described in greater detail hereinbelow), can accommodate rapid, seamless insertion (overlay) of material from multiple video sources, for example, to insert local advertising into a nationally broadcast program. This can all be accomplished while simultaneously maintaining optimum MPTS "balance" and utilization and while matching QAM channel capacity.

According to an aspect of the invention, the present inventive multiplexer minimizes authorization (entitlement/encryption) latency during session initialization by using previously allocated encryption channels for encryption when required encryption parameters (authorization tier/service group) can be accommodated by such channels. New encryption channels are allocated only when previously allocated channels cannot meet the encryption requirements of a new session (e.g., parameters incompatible or encryption channel capacity exceeded). When a session is initialized, the session manager identifies the next available encryption channel and provides it to the multiplexer. If the multiplexer determines that previously allocated encryption channels can be used, it refuses the new channel and uses a suitable existing one. If, however, the current session cannot be accommodated by previously allocated encryption channels, the multiplexer accepts the new channel and the session manager establishes encryption parameters for that channel.

According to an aspect of the invention, the multiplexer groups sessions into encryption channels according to service group. Alternatively, the multiplexer can group sessions into encryption channels by authorization tier.

According to an aspect of the invention, latency is minimized in switching between video segments by establishing more than one virtual channel per physical channel to a client device. The multiplexer effects rapid, seamless video switching by providing the new content on a different virtual channel on the same physical channel and causing the client device to switch virtual channels. This also implicitly forces resynchronization of the client device.

BRIEF DESCRIPTION OF THE DRAWINGS

These and further features of the present invention will be apparent with reference to the following description and drawing, wherein.

DETAILED DESCRIPTION OF THE INVENTION

Figure 1:
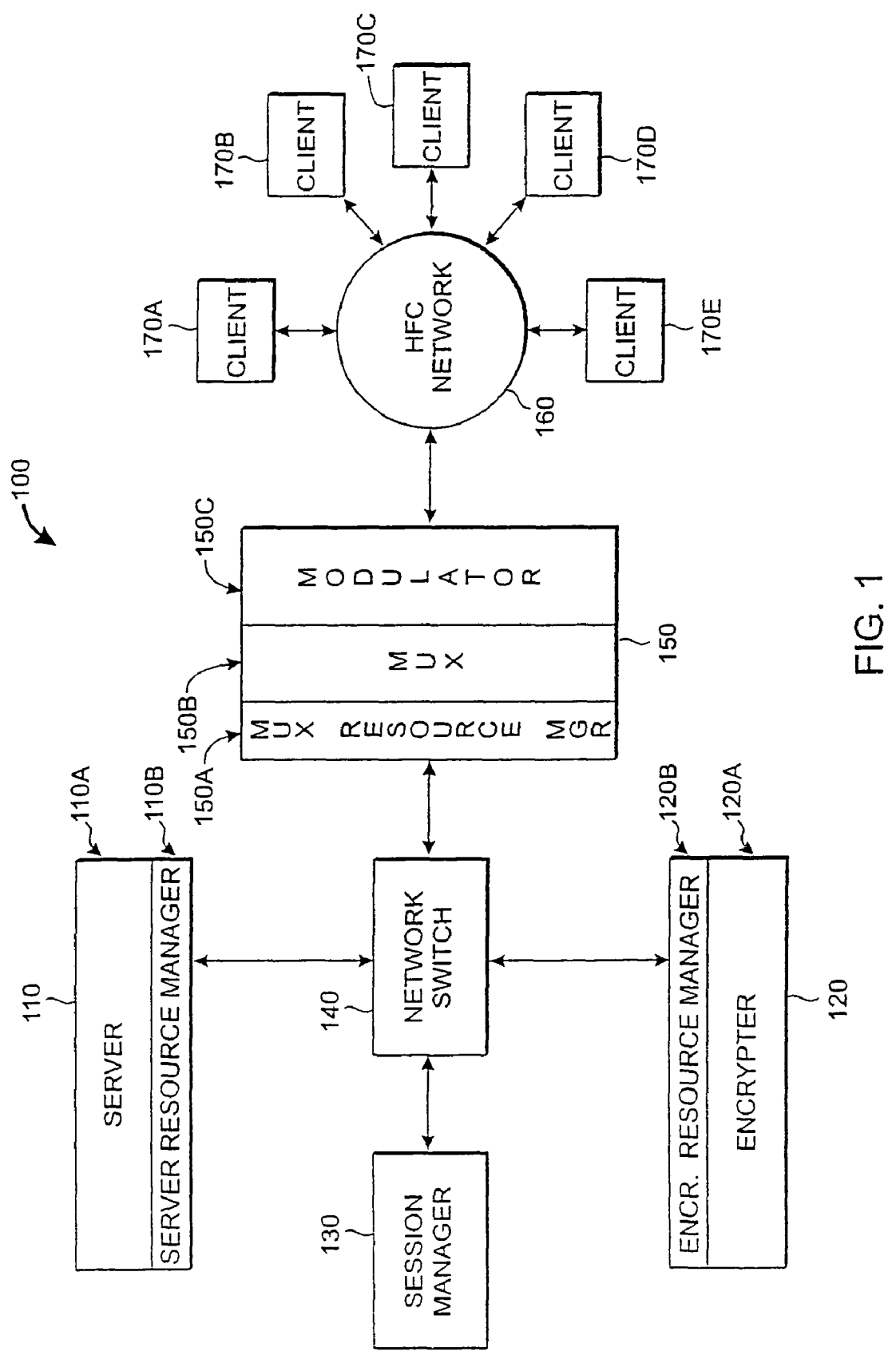
FIG. 1 is a block diagram of an embodiment of a network-connected video multiplexer system employing a combination multiplexer-modulator, in accordance with the present invention.

According to the present inventive technique, a video distribution system comprises one or more cable headends and small "edge" devices (i.e., all interconnected by a large metropolitan-area network. FIG. 1 is a block diagram of one embodiment of such a system 100. In FIG. 1, a "headend" network portion of the system 100 comprises server module 110, an "encrypter" module 120, a session manager 130, and a network switch 140. The network switch 140 provides connectivity between the various headend modules and any "edge" modules. In FIG. 1, a single representative edge module (150) is shown—an integrated multiplexer/modulator module 150 that acts as a network edge device to which a plurality of client devices 170A, 170B, 170C, 170D and 170E connect via a physical distribution system 160. The physical distribution system 160 provides "last mile" connectivity to the client devices located at end user locations, and is typically provided by a hybrid fiber/coax (HFC) or similar distribution medium as shown in the Figure. In a large metropolitan system, there would typically be many such "edge" modules (e.g., 150) connected to the server module 110 via the headend network switch 140. Each such edge module would in turn transmit to a similar cluster of client devices (e.g., 170'x') via a plurality of similar "last mile" distribution networks (e.g., 160). Typically, the client devices are set-top boxes (STB's) at an end-user location. The server function 110 further comprises a server 110A that provides server resources (i.e., program content) in the form of multi-channel multiplexes and a server resource manager 110B for accessing and controlling the routing of server resources within the headend network. The encrypter function 120 provides the basis of conditional access (CA) functionality, and further comprises an encryption "engine" 120A (encrypter) and an encrypter resource manager 120B for accessing and controlling the routing of, e.g., video program content through the encrypter 120A. A session manager 130 acts as the "brain" of the headend network, determining what program information will be delivered where and how it will be encrypted. The session manager 130 orchestrates the flow of video data within the headend between the server function 110 and the encrypter function 120, and controls routing of encoded/encrypted video program content to client devices 170'x' via the integrated multiplexer/modulator function 150. The integrated multiplexer/modulator function 150 further comprises a multiplex resource manager 150A, a multiplexer 150B and a modulator 150C. The multiplex resource manager 150A controls access to the multiplexer and determines how program content (made available to the multiplexer 150B via the network switch) is to be combined into multi-channel multiplex streams and routed to the clients 170'x'. A modulator 150C formats the video information for transmission over the HFC medium. Typically, the modulator 150C is a Quadrature Amplitude modulator (QAM) operating according to a standard for digital video modulation and transmission such as ITU-T J.83b.

In the example of FIG. 1, all program content is stored on the server 110A in the headend. Typically, the server comprises one or more interconnected groups of video storage devices. Content from the server 110A is sent to the encrypter 120A to be scrambled and thus protected from unauthorized access. The multiplexer 150B then selects groups of programs and combines various video, audio, and data streams available on the server 110A into one or more multiplexes (multi-program data streams). These multiplexes are then processed by the modulator 150C and distributed over the Hybrid-Fiber-Coax (HFC) network 160 to the clients (170'x'). Each client (or set-top) 170'x' is then able to demodulate, decode, and display the programs on a conventional television receiver.

The session manager 130 controls the operation of the various system modules (server 110, encrypter 120 and integrated multiplexer/modulator 150) via their respective resource managers (server resource manager 110B, encrypter resource manager 120B and multiplex resource manager 150A) controlling allocation of resources between the various system modules over the network switch. A direct communication path exists between the session manager and individual Resource managers linked to the server, encrypter, and multiplexer. A less direct path exists between the session manager and each client, utilizing network links and modulated upstream or downstream channels.

In the context of the present inventive technique, the process of multiplexing program content into multi-channel multiplexes involves time stamping, PID (Packet ID) remapping, PMT (Program Map Table) and PAT (Program Allocation Table) creation, dejittering, and transport stream creation. Further, the creation of such multiplexes can further require transrating (rate shaping or conversion of a program stream to a different bit rate), statistical re-multiplexing, the handling of variable-bit-rate (VBR) steams, stream splicing for digital program insertion (DPI), and transcoding between different compression methods such as between MPEG-4 and MPEG-2. Generally speaking, multiplexing is independent of modulation, with little technology overlap or integration synergy between the two.

On the other hand, signal processing and integration synergies do exist between multiplexing and encryption and between multiplexing and network switching. For these and other reasons it may be desirable to separate the multiplexer from the modulator so that the multiplexer can be relocated from the edge device to the headend where such integration synergy can be better exploited. This integration synergy helps to facilitate certain features and benefits of the present inventive technique that are described in greater detail hereinbelow.

Figure 2:
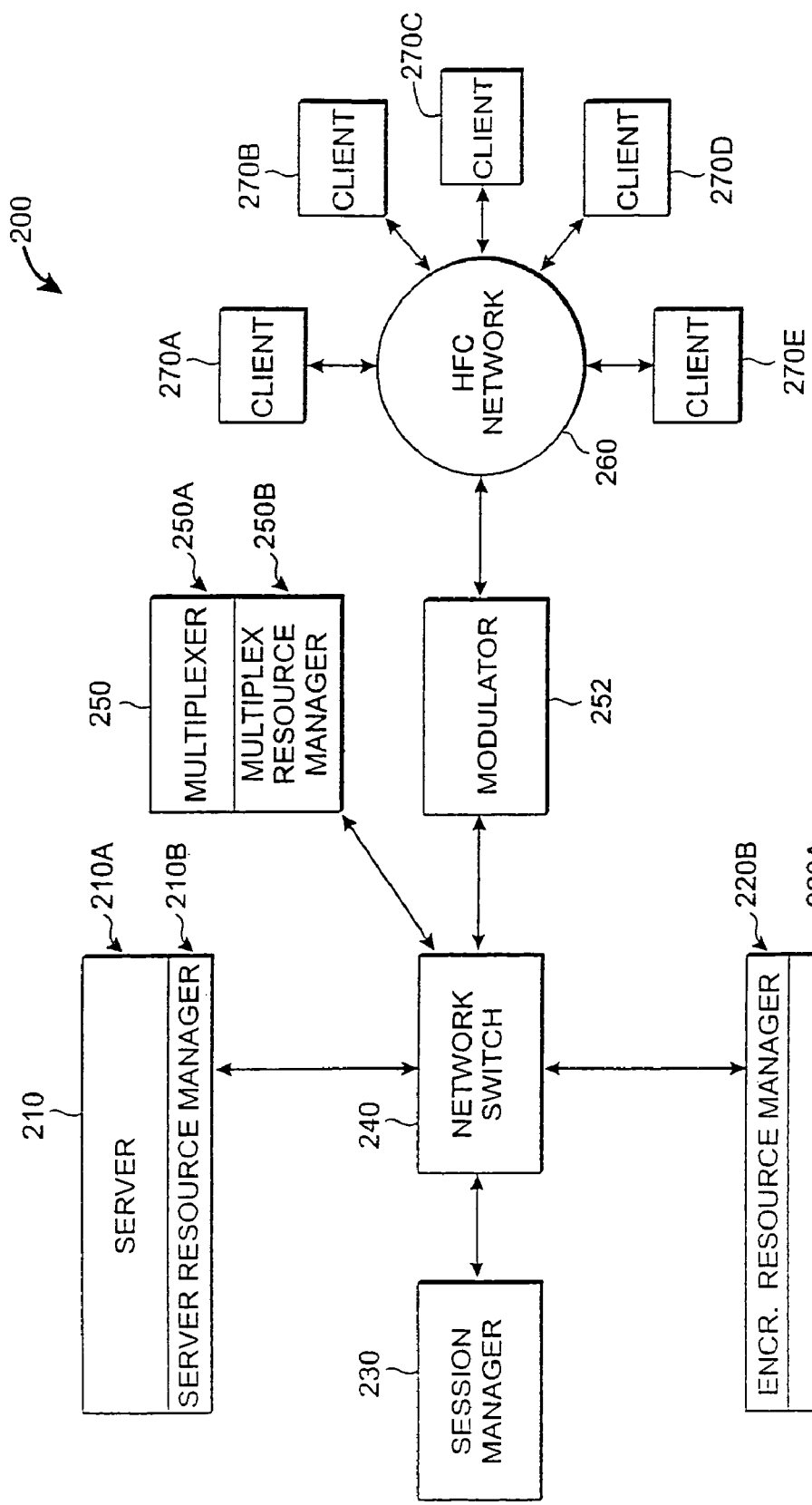
FIG. 2 is a block diagram of another embodiment of a network-connected video multiplexer system employing separate multiplexer and modulator functions, in accordance with the present invention.

FIG. 2 is a block diagram of an embodiment of a system 200 similar to the system 100 of FIG. 1 except that a separate multiplexer module 250 and modulator 252 are employed. Like the embodiment of FIG. 1, the system 200 of FIG. 2 includes a headend portion comprising a server module 210 (comprising a server 210A and a server resource manager 210B), an "encrypter" module 220 (comprising an encrypter 220A and an encrypter resource manager (220B), a session manager 230, and a network switch 240. In addition, the multiplexer module 250 (further comprising a multiplexer 250A and a multiplex resource manager 250B) is provided separate from the modulator 252. Both the modulator 252 and the multiplexer module 250 are connected to other headend modules via the network switch 240. The modulator 252 connects to a plurality of clients 270A, 270B, 270C, 270D and 270E via a physical "last mile" network 260 (shown in the Figure as a HFC network).

Dataflow between the various modules of the system 200 is shown and described in greater detail hereinbelow with respect to FIG. 3.

Figure 3:
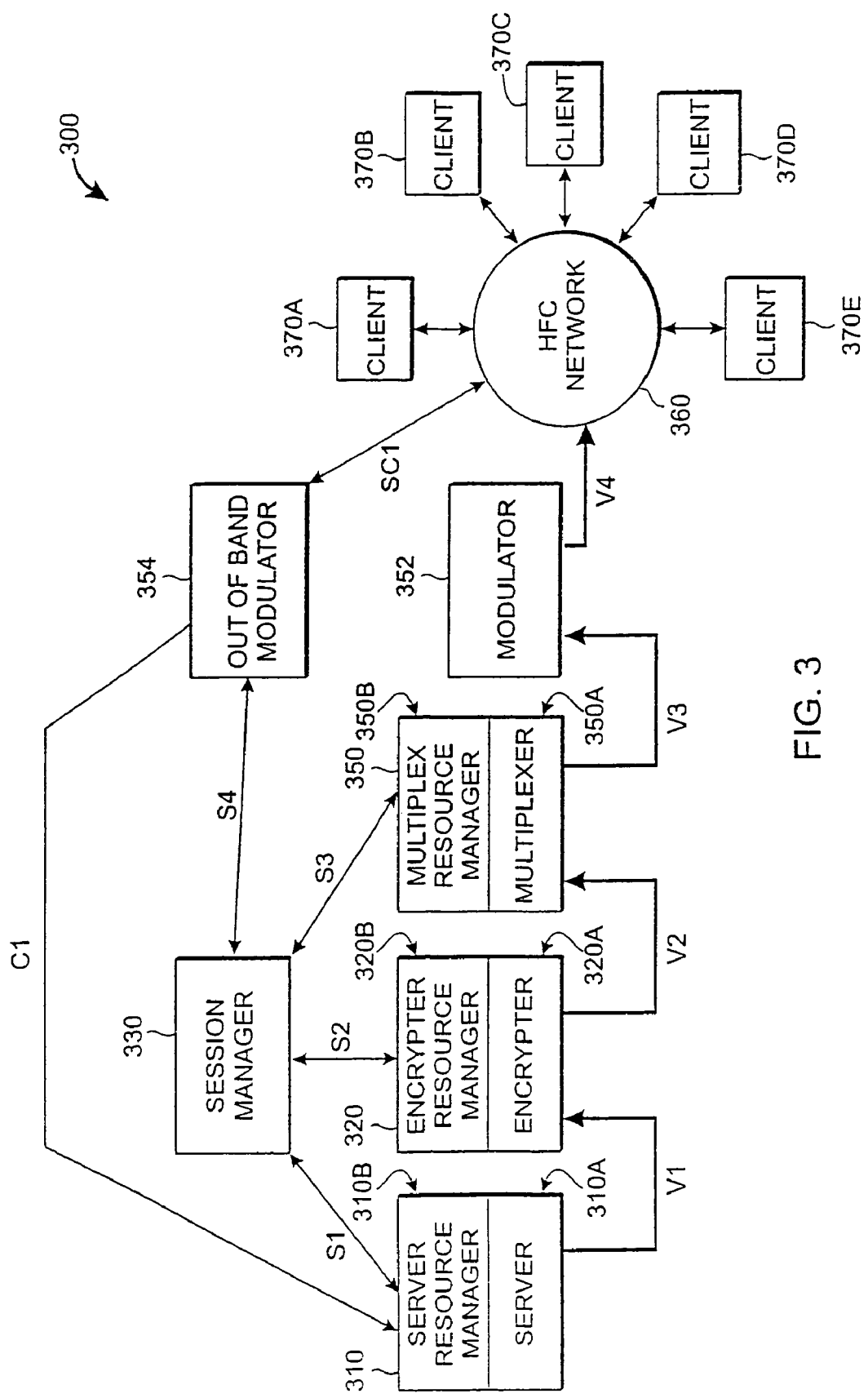
FIG. 3 is a block diagram of an embodiment of a video multiplexer system showing a first dataflow between various system modules, in accordance with the present invention.

FIG. 3 is a block diagram of an embodiment of a video multiplexer system similar to those shown and described hereinabove with respect to FIGS. 1 and 2, but organized to illustrate dataflow between various system modules. In FIG. 3, the system 300 comprises a server module 310, an encrypter module 320, a session manager module 330, a multiplexer module 350 and a modulator 352. The modulator is connected to a "last mile" physical network 360 (shown in the Figure as a HFC network) to which a plurality of clients 370A, 370B, 370C, 370D, and 370E are connected. Additionally, an out-of-band modulator 354 is provided for server-client communications.

The server module 310 (compare 110, FIG. 1 and 210, FIG. 2) further comprises a server 310A and a server resource manager 310B. The encrypter module 320 (compare 120, FIG. 1 and 220, FIG. 2) further comprises an encrypter 320A and an encrypter resource manager 320B. The multiplexer module 350 (compare 150, FIG. 1 and 250, FIG. 2) further comprises a multiplexer 350A and a multiplex resource manager 350B.

FIG. 3 is organized to show dataflow between system modules, but the physical system can be that shown in FIG. 1 or FIG. 2, with the network switch (140, FIG. 1 or 240, FIG. 2) providing communications between the modules. Since the network switch plays no active part other than data transport, it is omitted in FIG. 3. The system modules (310, 320, 330, 350, 352), the HFC network 360 and the clients 370'x' serve the same purposes as their counterparts in FIGS. 1 and 2. In FIG. 3, various data communications paths are shown. Data communications paths "S1", "S2", "S3" and "S4" are session communications paths controlled by the session manager. Data communications paths "V1", "V2", "V3" and "V4" are video/audio communications paths over which program content is passed. Data communications path "C1" is a client communications path between the server communications manager 350B and the various clients 370'x'. Data communications path "SC1" is composite of session communications S4 and client communications C1 directed through the out-of-band modulator 354 over the HFC network 360 for communications with the clients 370'x'.

Assuming a multiplexer system with physical connectivity similar to that shown in FIG. 2, communications paths S1, S2, S3, S4, C1, V1, V2 and V3 would all occur via the network switch (240, FIG. 2). Communications paths SC1 and V4 occur directly between the modulators 354 and 352 (252), respectively and the HFC network 360 (260). Alternatively, communications path C1 could be routed via path S4 between the out of band modulator 354 and the session manager 330 and path S1 between the session manager 330 and the server resource manager 310B.

The session manager 330 (compare 130, 230) communicates with the server resource manager 310B via communication path S1, with the encrypter resource manager 320B via communications path S2, with the multiplex resource manager 350B via communications path S3 and with the out-of-band modulator 354 via path S4. The out-of-band modulator 354 provides data connectivity between the session manager 330, the server resource manager 310B and the clients 370'x' via the physical "last mile" network 360, with communications "subsessions" on communications path S4 being set up with the various clients 370'x' as required. The session manager, based upon user demand, directs video, audio and/or multimedia program information from the video server 310A to the encrypter 320A via communications path "V1", from the encrypter 320A to the multiplexer 350A via communications path "V2", from the multiplexer 350A to the modulator 352 via communications path "V3" and from the modulator 352 to the clients 370'x' over the HFC network 360 via communications path "V4". The clients 370'x' communicate with the session manager 330 over communications paths "SC1" and "S4". The servers 370'x' communicate with the server resource manager 310B over communications paths "SC1" and "C1".

Figure 4:
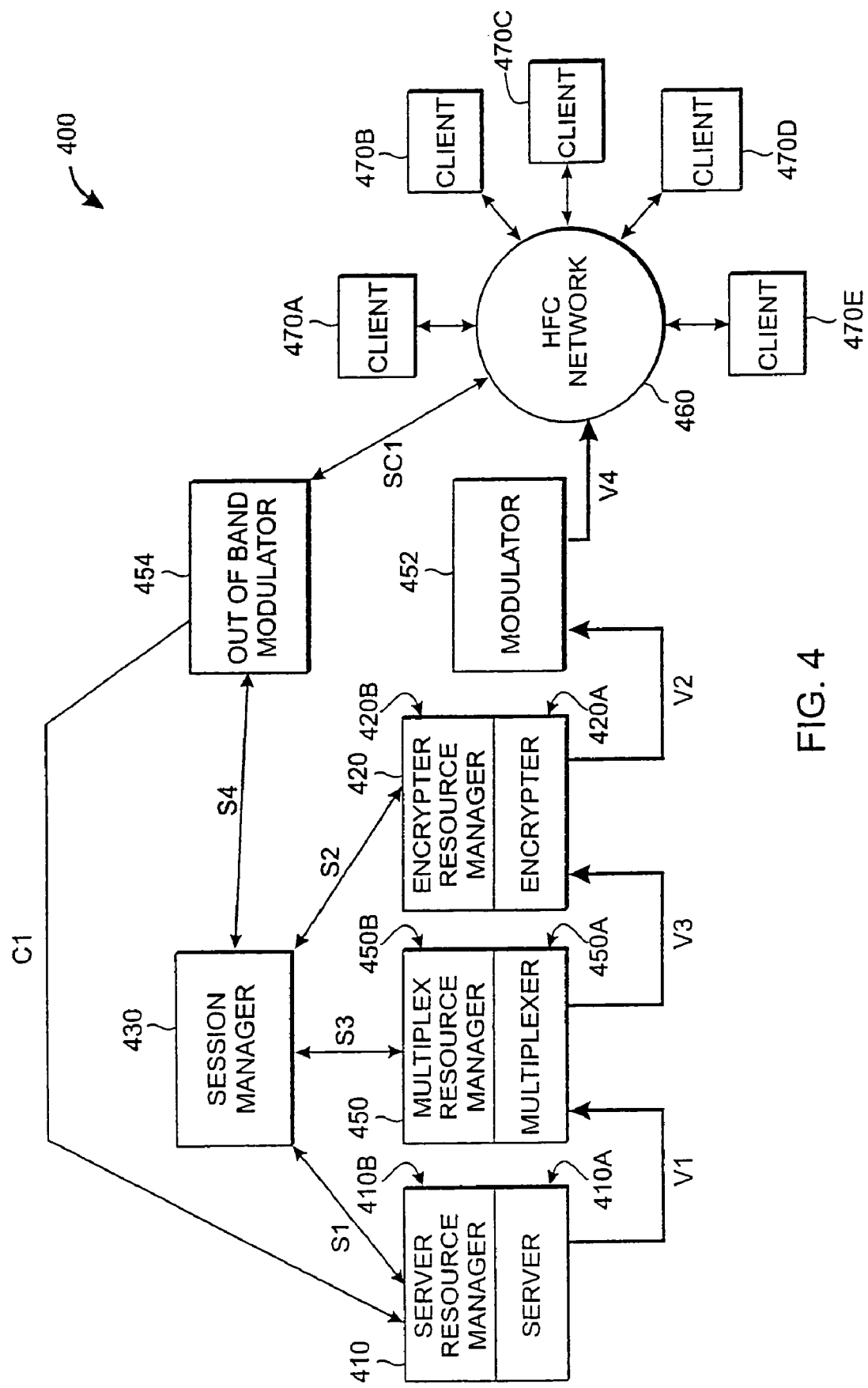
FIG. 4 is a block diagram of another embodiment of a video multiplexer system showing an alternative dataflow between various system modules, in accordance with the present invention.

As described hereinabove, the present inventive technique can be practiced using the networked components and interfaces as shown and described hereinabove with respect to FIG. 1 and FIG. 2. Even assuming fixed physical network connectivity, additional benefit can be derived introducing changes to the flow of the video traffic within the multiplexer system. By way of example, the multiplexing process (150B, 250A, 350A) can be coupled to and coordinated with the encryption process (120A, 220A, 320A) via the session manager (130, 230, 330) and the network switch (140, 240). FIG. 4 illustrates the dataflow for this variation.

FIG. 4 is a block diagram of another embodiment of a video multiplexer system 400 similar to the video multiplexer system 300 of FIG. 3, but showing an alternative dataflow topology between various system modules.

Like the system 300 of FIG. 3, the system 400 of FIG. 4 embodies comparable elements: a server module 410 (compare 310) comprising a server 410A and a server resource manager 410B; an encrypter module 420 (compare 320) comprising an encrypter 420A and an encrypter resource manager 420B; a session manage 430 (compare 330); a multiplexer module 450 (compare 350) comprising a multiplexer 450A and a multiplexer resource manager 450B; a modulator 452 (compare 352) and an out-of-band modulator 454 (compare 354). As in the system 300 of FIG. 3, the elements of the system 400 are interconnected by any suitable means, such as in a locally networked configuration as shown in FIGS. 1 and 2. The modulator 452 and out-of-band modulator 454 connect to a "last mile" network 460 (compare 160, 260, 360) shown in the Figure as an HFC network. A plurality of clients 470A, 470B, 470C, 470D and 470E (compare 170A-E, 270A-E, 370A-E) connect to the "last mile" network 460 and communicate via the modulator 452 and out-of-band modulator 454.

In FIG. 4, various data communications paths are shown. As before, data communications paths "S1", "S2", "S3" and "S4" are session communications paths controlled by the session manager; data communications paths "V1", "V2", "V3" and "V4" are video/audio communications paths over which program content is passed; data communications path "C1" is a client communications path between the server resource manager 450B and the various clients 470'x'; and data communications path "SC1" is a composite of session communications S4 and client communications C1 directed through the out-of-band modulator 454 over the HFC network 460 for communications with the clients 470'x'.

The communications dataflow in FIG. 4 differs only in that the order of the multiplexer module 450 and encrypter module 420 is reversed in the video path. In the dataflow topology shown in FIG. 4, communication path V1 goes from the server 410A to the multiplexer 450A, the communication path V3 goes from the multiplexer 450A to the encrypter 420A and the communication path V2 goes from the encrypter 420A to the modulator 452.

In this case, single-program transport streams (SPTSs) first exit the server 410A to the multiplexer 450 where, if they are not already VBR (variable bit rate) streams, they can be transrated into VBR streams for better efficiency, and statistically re-multiplexed into a constant bit rate multi-program transport stream (MPTS) whose bit rate matches that of the modulator 452. The MPTS is then encrypted and is transported (over the network via communication path V2) to the modulator where it is transmitted to the clients 470'x' via the HFC network 460.

Figure 5:
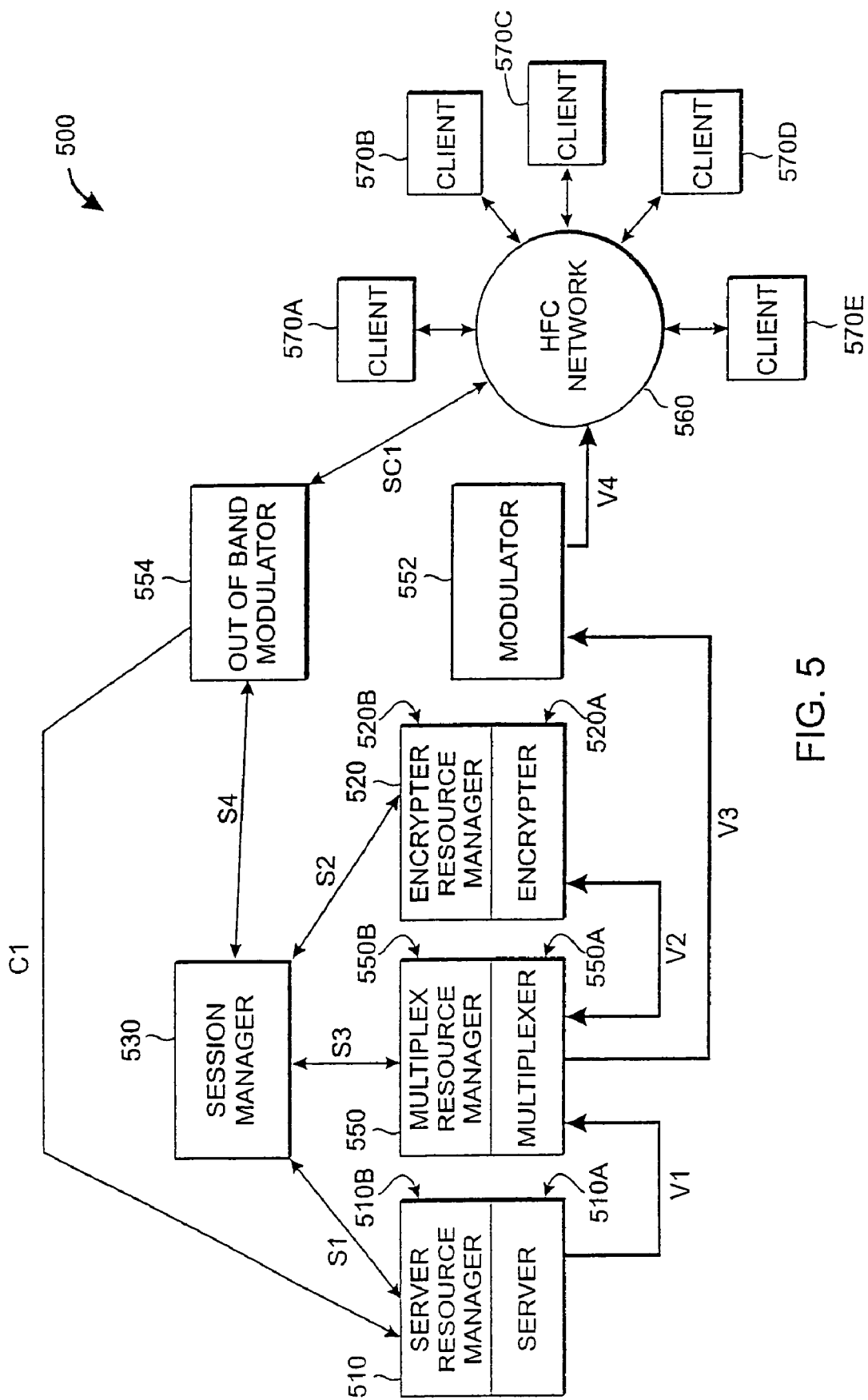
FIG. 5 is a block diagram of another embodiment of a video multiplexer system showing still another alternative dataflow between various system modules, in accordance with the present invention.

Additional multiplexing advantages can be realized if the encrypter is logically combined with the multiplexer as shown in FIG. 5. This modification enables the use of a multiplexed encryption scheme, where the multiplexer is able to select which packets are to be encrypted and is able to control how these encrypted packets are sequenced into the outgoing streams. The benefits include much better utilization of available encryption resources and the ability to eliminate the latencies associated with the authorization of new on-demand sessions.

FIG. 5 is a block diagram of video multiplexer system 500 showing this alternative dataflow effectively combining the functions of multiplexer and encrypter.

Like the system 400 of FIG. 4, the system 500 of FIG. 5 embodies comparable elements: a server module 510 (compare 410) comprising a server 510A and a server resource manager 510B; an encrypter module 520 (compare 420) comprising an encrypter 520A and an encrypter resource manager 520B; a session manage 530 (compare 430); a multiplexer module 550 (compare 450) comprising a multiplexer 550A and a multiplexer resource manager 550B; a modulator 552 (compare 452) and an out-of-band modulator 554 (compare 454). As in the systems shown and described hereinabove with respect to FIGS. 3 and 4, the elements of the system 500 are interconnected by any suitable means, such as in a locally networked configuration as shown in FIGS. 1 and 2. The modulator 552 and out-of-band modulator 554 connect to a "last mile" network 560 (compare 160, 260, 360, 460) shown in the Figure as an HFC network. A plurality of clients 570A, 570B, 570C, 570D and 570E (compare 170A-E, 270A-E, 370A-E, 470A-E) connect to the "last mile" network 560 and communicate via the modulator 552 and out-of-band modulator 554.

In FIG. 5, various data communications paths are shown. As before, data communications paths "S1", "S2", "S3" and "S4" are session communications paths controlled by the session manager; data communications paths "V1", "V2", "V3" and "V4" are video/audio communications paths over which program content is passed; data communications path "C1" is a client communications path between the server resource manager 510B and the various clients 570'x'; and data communications path "SC1" is a composite of session communications S4 and client communications C1 directed through the out-of-band modulator 554 over the HFC network 560 for communications with the clients 570'x'.

The communications dataflow in FIG. 5 is very similar to that shown in FIG. 4, except that video communication with the encrypter 520A occurs exclusively with multiplexer 550A. The communication path "V2" is bi-directional and is the only video communication path to the encrypter 520. The multiplexer 550A transmits video data to the modulator 552 over the communication path V3.

Having the functions of multiplexing put before the encryption process or coupled with the encryption process allows on-demand video network functions to transrate and transcode program transport streams. This enables transport and delivery of VBR streams thereby utilizing server disk space, transport network bandwidth, and "last mile" HFC transmission bandwidth much more efficiently. The process of switching streams over the network entails identifying streams, making decision on where they go next and with what other streams, and performing QoS (Quality of Service) processing. Those of ordinary skill in the art will immediately appreciate and understand that these switching functions are similar to and related to the known processes of MPEG multiplexing which also involve identifying streams, labeling them, combining them with other streams, and performing QoS processing such as transrating.

By decoupling multiplexing (and the multiplex-related function of transrating) from modulation and collocating the multiplexer (logically) with the encryption function (e.g., headend or edge), higher network efficiency is realized because the ability to transport VBR streams throughout the network (as opposed to constant bit rate or CBR streams) provides 40% or more savings in disk storage space, network transport bandwidth, and last-mile HFC transmission bandwidth. On today's current technological course, advancements in signal processing architectures, and system implementations can be expected to dramatically reduce the cost embedding transrating and transcoding into the multiplexer function. The resultant savings in disk space, transport bandwidth and HFC transmission bandwidth will then more than mitigate the cost of adding those transcoding and transrating capabilities.

Because of these synergies and similarities in processing functions, having multiplexing near and/or combined with encryption (logically via networking and/or physically via integration) can result in the need for less hardware, lower stream processing latencies, and increased system throughput. At the same time, having a stand-alone multiplexer allows flexibility in where multiplexing goes in a cable system and leaves that decision to the cable operator based upon specific system needs and system topologies.

The present inventive technique provides a basis for delivery of On-Demand Video services. It is capable of co-existing with and providing added efficiencies to digital broadcast video distribution systems, regardless of whether the services originate from real-time encoders, satellite receivers, video servers, or other sources. Broadcast services can also use the transrating, transcoding, statistical multiplexing, splicing, and encryption capabilities of the inventive multiplexer for next generation on-demand video systems to save rack space and benefit form the much lower cost per stream of equipment designed and purchased for the on-demand video network.

Those of ordinary skill in the art will understand that the multiplexer system of the present invention is capable of supporting a variety of Video On Demand (VOD) services including Movies on Demand, Subscription video on Demand (SVOD), Free Video on Demand, and other VOD-related services at different bit rates and improves the efficiency, flexibility, scalability, cost and performance to provide these services. The flexibility of the present invention with respect to transrating, transcoding, multiplexing and encryption greatly facilitates such On-Demand features.

Those of ordinary skill in the art will also understand that the multiplexer system of the present invention can support HDTV (High-Definition Television) On Demand Services and improves scalability and flexibility with respect to delivery of HDTV On Demand Services. While modulators and upconverter are not concerned with the meaning of the transport streams they operate upon, multiplexer systems are tightly connected to the format of their transport streams. By separating multiplexer and modulator functionality, the present inventive technique simplifies deployment of HDTV and mixed HDTV/SDTV (Standard Definition Television) services by allowing multiplexers to combine both SDTV and HDTV streams into common MPTS signals.

The multiplexer system of the present invention further supports and enables interactive Digital Program Insertion (DPI) services (e.g., for inserting local advertising into a network broadcast stream) in narrowcast and on-demand video streams. Generally speaking, DPI either requires pre-conditioning of streams at splice points ahead of time or requires transrating in real time at the time of the splice. Pre-conditioning requires pre-planning and limits flexibility in selecting the points at which one can insert an advertisement. Transrating is the preferred method because it provides more flexibility and cleaner splices. Due to the flexibility of the present inventive technique with respect to transrating and multiplexing, DPI is easily accommodated.

The present inventive technique also facilitates such features as networked Personal Video Recording (PVR). In a networked PVR system, the vast majority of programming typically originates from digital satellite broadcast sources directly from the cable networks or from other digital satellite program sources such as HITS (an acronym for "Headend In The Sky"). These digital satellite sources are typically statistically multiplexed, and their video multiplex streams are in VBR form. By providing on-demand video networking applications with an operationally smooth and resource-efficient way to store, transport, and deliver these VBR streams in their efficient native VBR form, the video multiplexer system of the present invention readily accommodates the addition of PVR services. The present inventive techniques multiplexing capabilities with respect to transrating and statistical re-multiplexing are highly advantageous in such applications.

As with networked PVR services, the vast majority of video sources for switched broadcast originate from digital satellite broadcast sources directly from the cable networks or from sources such as HITS. As previously stated, these digital satellite sources are typically statistically multiplexed, and the constituent video streams in the multiplex are in VBR form. The same capabilities of the present inventive technique that make it well suited to networked PVR services also make it well suited to delivery of Switched Broadcast Video Services.

Those of ordinary skill in the art will immediately understand that the flexibility of the present inventive video multiplexer system permits multiplexing functions to be shared between digital set-top box video services and PC streaming media services, thus, providing a cost-effective platform for delivery of data network services alongside video services, therefore supporting and improving the cost effectiveness of providing streaming media PC services.

MPEG-4/Part 10 (H.264) encoders and set top boxes will soon become available and it is therefore highly desirable to accommodate this and other emerging standards. The present inventive multiplexing technique is specifically designed to work directly with transcoders and transraters, and is therefore ideally suited to the addition of new video/audio/data formats. By adding transcoding capability between MPEG-4/Part10 and MPEG-2, cable operators can smoothly migrate in MPEG-4/Part 10 set top boxes while continuing to use legacy MPEG-2 set top boxes in the same cable plant, in the same nodes, and in the same service groups.

In an on-demand service environment, every set top box has its own point-to-point connection to the source in the headend. If that source (whether it is a satellite feed, real-time encoder, or video server) is in MPEG-4/Part 10 format, the multiplexer can, on a stream-by-stream basis, transcode to MPEG-2 to feed legacy MPEG-2 On-Demand clients or keep the stream in MPEG-4/Part 10 format to feed new MPEG-4/Part 10 On-Demand clients. By using MPEG-4/Part 10 for satellite feeds, real-time encoding, and/or storage on video servers, cable operators can achieve a 2-3 times gain in the number of streams that can be transmitted in a satellite transponder, stored on video servers, transported over the network, and sent down a QAM channel.

The present inventive multiplexing technique has a significant advantage over prior-art techniques in that it eliminates delay associated with session authorization. In addition, the present inventive video multiplexer can also play an important role in reducing latencies associated with client requests for VCR-like "trick modes" such as pause, changes in playback speed or direction, or random accesses, either to a different program or to a different location in the program that is currently playing. The implementation of these features at the multiplexer requires a slight modification to the way that video is streamed from the server. This latency reduction is described in greater detail hereinbelow.

Figure 6:
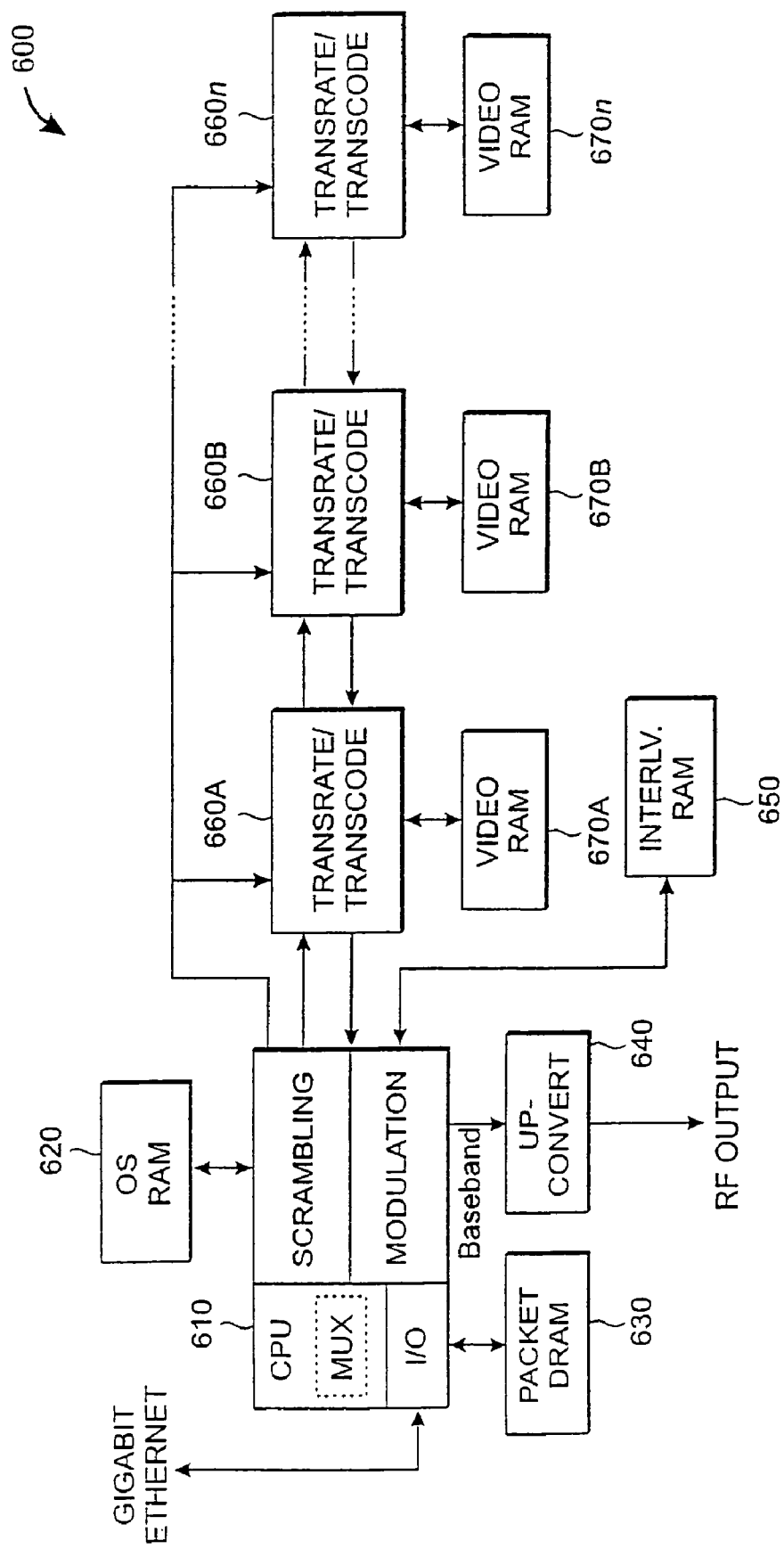
FIG. 6 is a block diagram of an embodiment of a transrating/transcoding video multiplexer system, in accordance with the present invention.

FIG. 6 is a block diagram of an embodiment of a multiplexer module 600, in accordance with the present invention. The multiplexer module 600 comprises an integrated video multiplexer function 610, Operating System (OS) RAM 620, Packet RAM 630, an Upconversion function 640, interleave RAM 650, and a plurality of transrate/transcode modules 660A, 660B . . . 660n, each transrate/transcode module having an associated video RAM 670A, 670B, . . . 670n. The multiplexer function embodies a CPU (and associated software), an integrated multiplexer function (MUX), a network interface (I/O—Gigabit or 10 Gigabit Ethernet), scrambling and modulation. The multiplexer module 600 is representative of the multiplexer modules (e.g., 150, 250, 350, 450, 550) shown and described hereinabove with respect to the video multiplexer systems (100, 200, 300, 400, 500) of FIGS. 1-5. Within the context of the multiplexer systems shown and described hereinabove, the multiplexer module communicates with a session manager and receives program streams from a server module via a network interface. This network interface is shown in FIG. 6 as a Gigabit or 10 Gigabit Ethernet link to an external Network Switch (e.g., 140, 240). The multiplexer module 600 also manages the encryption process. Selected packets of each program are identified by the multiplexer function 610 for encryption and are sent to an external encrypter module (e.g., 120, 220, 320, 420, 520) via the Gigabit Ethernet link and are subsequently returned to the multiplexer function 610 via the same link once they have been encrypted. Alternatively, the packets could be encrypted using local resources. In one such alternative embodiment, the encryption keys could be received from an external encryption resource manager such as 120B, 220B, 320B, 420B, and 520B and the packets could then be encrypted locally using a scrambler included in multiplexer module 610. In this case, the encryption keys would also be provided to the multiplexer in an encrypted format (i.e. as ECM packets) and these packets could then be conveyed to the receiving devices by including them in the output data stream. In a second alternative embodiment, the multiplexer could include additional resources in order to generate and encrypt both the data packets and the encryption keys. In this case, an external encrypter (120, 220, 320, 420, 520) would not be needed at all.

In the embodiment of FIG. 6, the modulator and multiplexer are combined into a single integrated multiplexer function. The output of the integrated multiplexer function 610 is a baseband, modulated multiplex stream which is presented to the upconverter function 640 for upconversion to produce an RF output for direct transmission via a "last mile" physical transmission medium such as an HFC network.

In the alternative, the modulator function could be physically separated from the multiplexer function 610 and multiplexer module 600 (as shown in FIG. 2), in which case, the output of the multiplexer function 610 would be a multiplex stream that would be sent to an external modulator, preferably via the Gigabit Ethernet link and external network switch.

The integrated multiplexer function 610 also manages external resources (the transcoder/transrater functions 660'x' and their associated video RAM 670) to perform transrating and transcoding functions. Video Random Access Memory (Video RAM) 670'x' is utilized by the transrating and transcoding processes to store video images during conversion (transrating/transcoding). The integrated modulator portion of the integrated multiplexer function 610 uses interleave RAM 650 to store symbols during the interleaving step of the modulation process. The I/O portion of the integrated multiplexer function 610 uses Packet RAM to buffer MPEG packets, and the CPU portion of the integrated multiplexer function uses OS RAM 620 to store instruction and data words for both operating system software and application software associated therewith.

Figure 7:
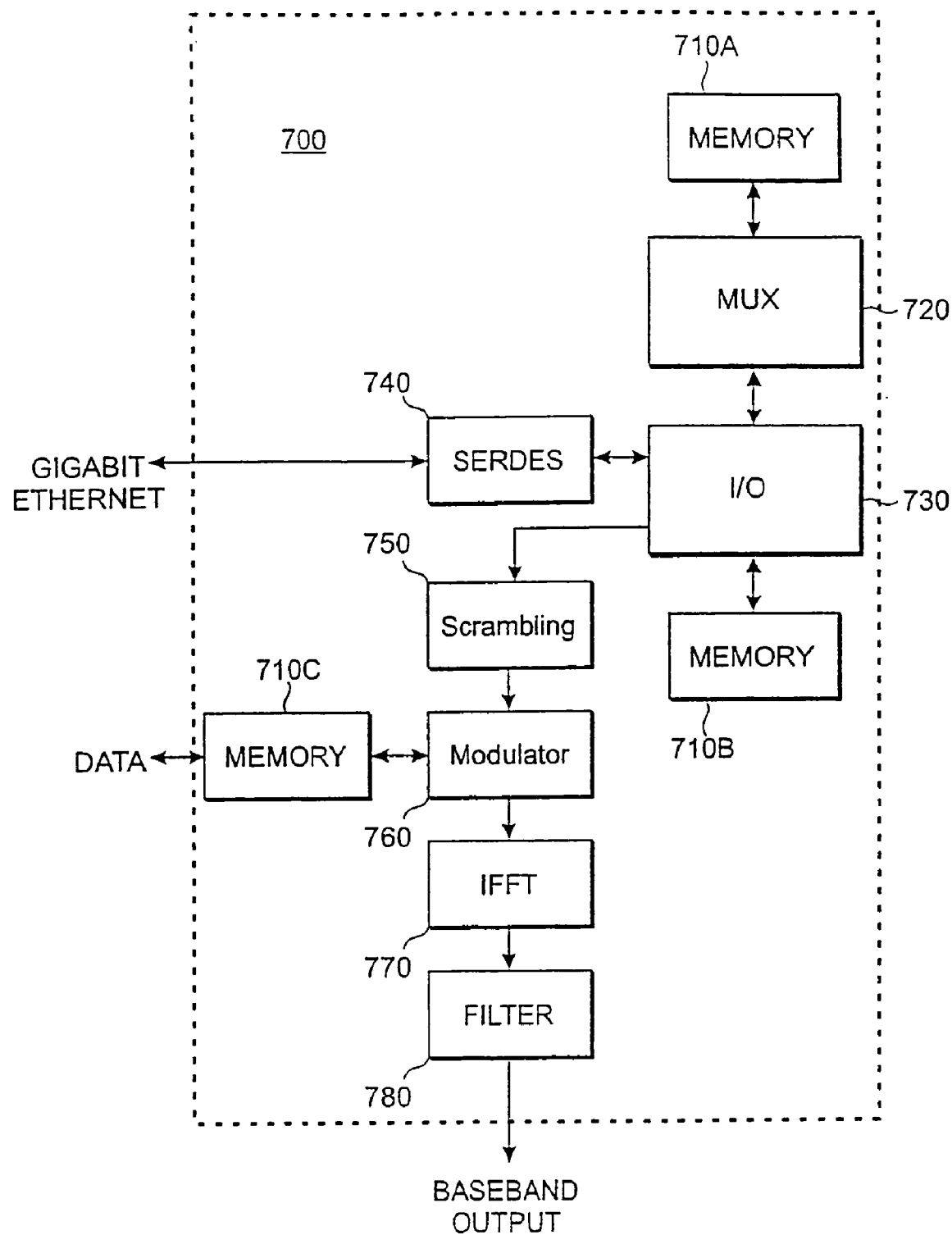
FIG. 7 is a block diagram of an integrated multiplexer-modulator function, in accordance with the present invention.

FIG. 7 is a block diagram of hardware components of an integrated multiplexer-modulator function 700 of the type described hereinabove with respect to FIG. 6. These hardware components are operated under the software control of a processing element (i.e., CPU) included in MUX module 720. These components include OS RAM memory block 710A (compare 620), packet RAM 710B (compare 630) and interleaver ram 710C (compare 650). These random access memory devices can be implemented using common dual data rate (DDR) or single data rate (SDR) synchronous dynamic RAM devices (SDRAM). Also included in the integrated multiplexer-modulator function 700 are I/O function 730, a SERDES (Serializer/Deserializer) function 740, a "scrambler" function 750, a modulator function 760, an IFFT function block 770 and a filter function block 780.

The SERDES (Serializer/Deserializer) function 740 provides an interface to a high-speed network communications link, shown in the Figure as a "Gigabit Ethernet" link. The SERDES function serializes and transmits data packets received from the MUX 720 over the network communications link. It also deserializes data packets received over the network communications link and delivers them to the MUX 720. These data packets can include session level communications (exchanged with the aforementioned CPU) and video stream data to be multiplexed, forwarded for subsequent encryption and/or modulated for transmission.

The MUX hardware 720 is essentially a selector switch that determines how data packets will be routed, and sequences and edits these packets as needed for seemless operation. This is done under the control of MUX software running on the aforementioned CPU. The I/O module 730 assists the MUX 720 in routing data packets by acting as a bridge between the SERDES Gigabit Ethernet interface 740, the modulator 760, the Mux software running on the CPU, MPEG packet storage in RAM block 710B, and external transrater/transcoder modules 660A-n. Video data packets for transmission can be received via the SERDES function from an external server (e.g., 110, 210 . . . ) or encrypter (e.g., 120, 220 . . . ), from external transrater/transcoder modules via the I/O module 730, or from the CPU (for direct insertion into the packet stream) via MUX block 720A. These video data packets are routed by the multiplexer through the scrambler 750 which encodes/encrypts the video data for transmission. The scrambler 750 passes the encoded/encrypted video data on to the J.83b compliant modulator 760. The modulator encodes the "scrambled" video data into QAM symbols, using RAM block 710C for interleaving. After QAM encoding, the IFFT function block 770 "channelizes" the data into a composite, multi-channel baseband data stream. This is accomplished by delivering the QAM encoded data to the IFFT function in synchronous fashion such that one channel's data symbols are presented at each "tap" of the IFFT, with the IFFT operated at a sample rate that provides the desired channel spacing between taps. After IFFT encoding, each channel is transformed such that it appears within a discrete channel frequency band of a baseband signal according to the IFFT "tap" at which is was presented. A subsequent filtering block 780 provides anti-aliasing and compensation, smoothing the baseband signal for upconversion (as required) and transmission. Preferably, the modulation, IFFT and filtering are performed in accordance with the ITU-T J.83b standard.

Figure 8:
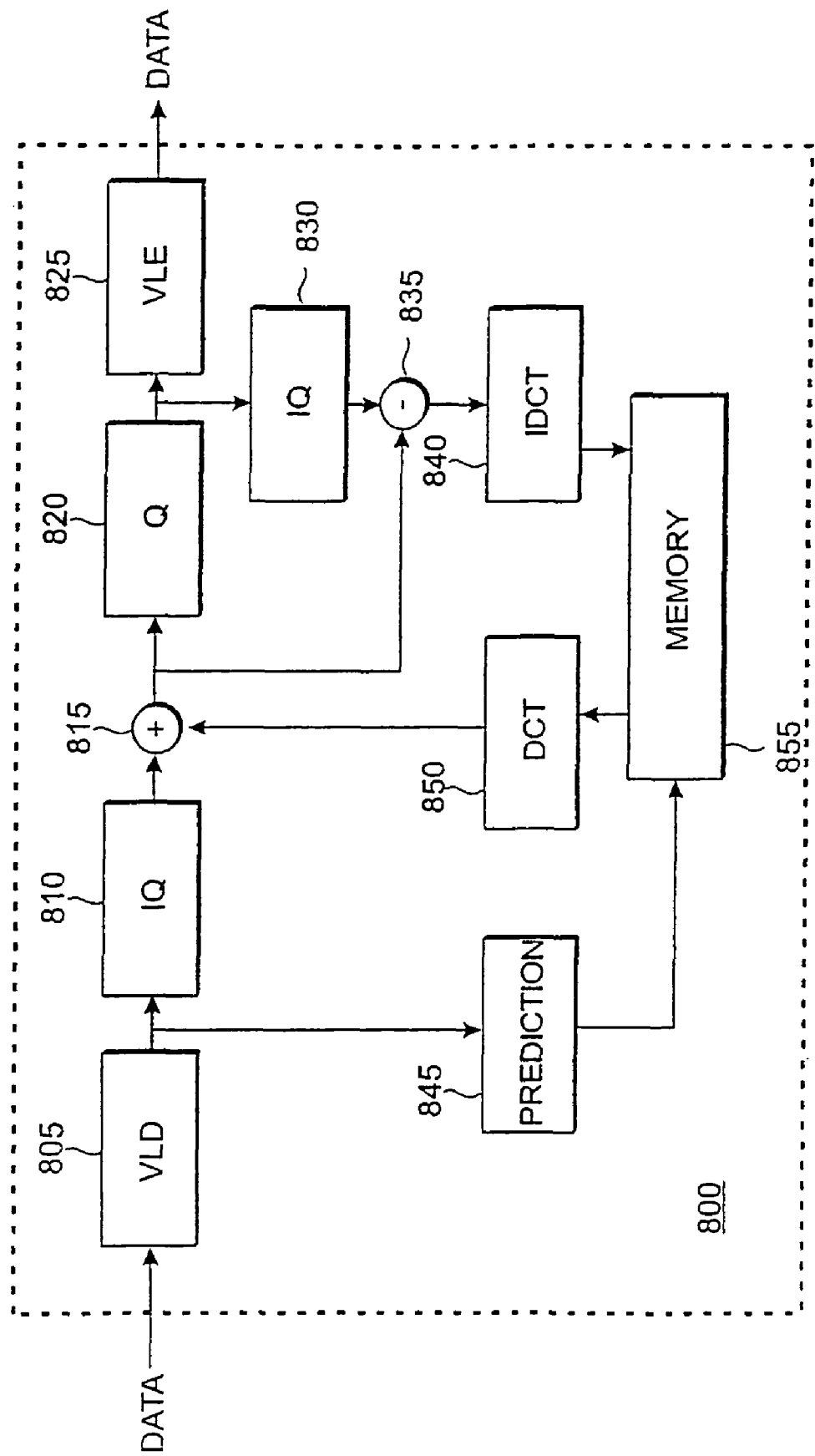
FIG. 8 is a block diagram of a transrating function, in accordance with the prior art.

FIG. 8 is a block diagram of a prior-art MPEG-2 Transrater module 800. The purpose of the transrater module is to decoder an incoming MPEG-2 stream and re-encode it at a different data rate. The incoming data is initially decoded by a variable-length decoder 805 (VLD). This is then presented to an Inverse Quantizer (IQ) function 810 (to restore quantized/encoded coefficient data to a "full" representation thereof). Predictive data, such as motion vectors, is operated upon by a prediction function block 845 and used in conjunction with stored frame images to construct intermediate frame difference images in image memory 855. A DCT (Discrete Cosine Transform) function 850 converts image difference data stored in image memory 855 and converts it into DCT coefficients. These are summed with coefficients from the inverse quantizer 810 in a summing block 815 to produce coefficient data for requantizing at a different level (to produce a different data rate) in a Quantizer block (Q) 820. Coefficient data from the quantizer block 820 is variable-length encoded (VLE) in an encoder block 825 for output as a transrated MPEG-2 data stream, and is also processed by a second inverse quantizer block (IQ) 830 and differenced with the coefficient from the summing block 815 in a differencing block 835. The coefficient differences are then operated upon by an IDCT (Inverse Discrete Cosine Transform) block 840 to produce difference frame image in image memory 855. The processing loop comprising the summing block 815, the inverse quantizer 830, the differencing block 835, the IDCT 840, the prediction block 845, the image memory 855 and the DCT 850 is used to prevent differences between the incoming and outgoing data streams from diverging as the prediction errors are propagated from one frame to the next.

The description hereinabove with respect to FIG. 8 is specific to MPEG transrating. Those of ordinary skill in the art will immediately understand that other types of transrating are known in the art and can be substituted. It is fully within the spirit and scope of the present inventive technique to do so.

Figure 9:
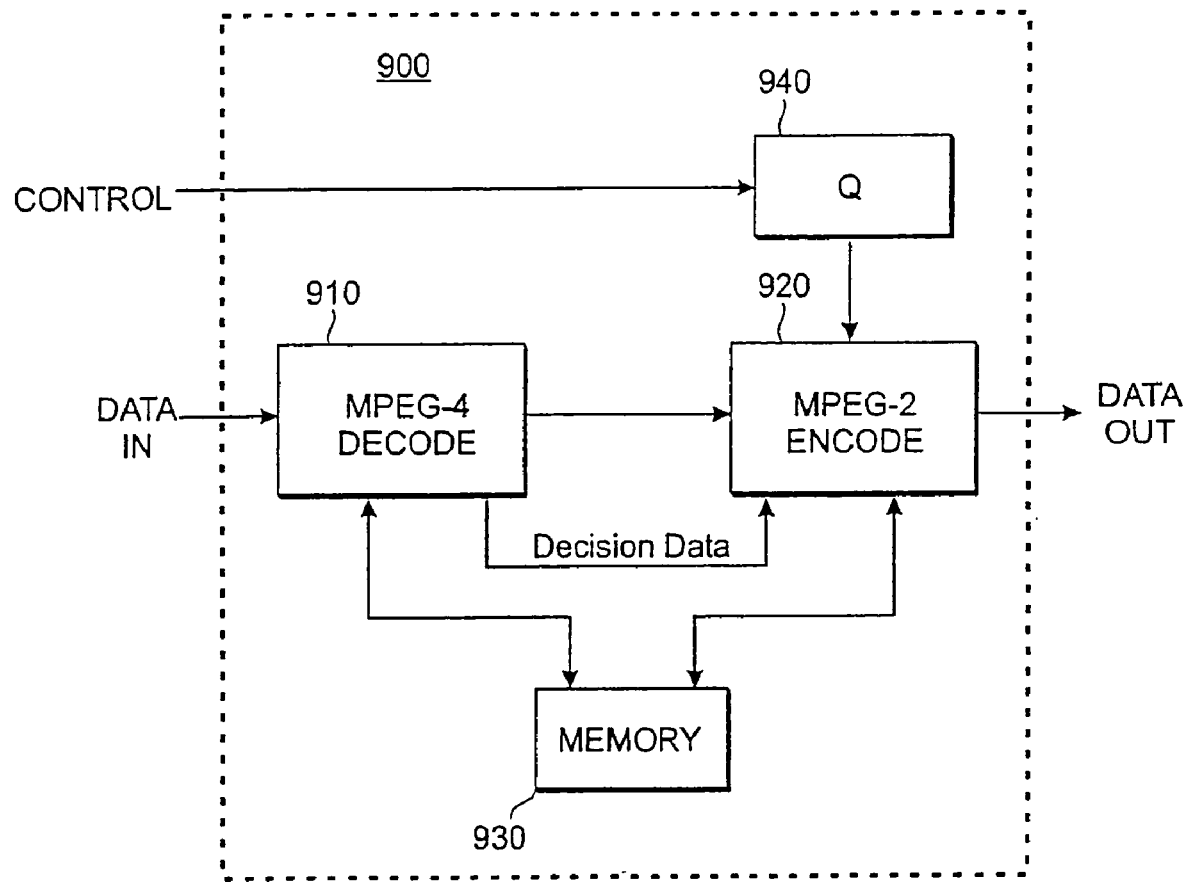
FIG. 9 is a block diagram of an MPEG-4 to MPEG-2 transcoding function, in accordance with the prior art.

FIG. 9 is a block diagram of a simple prior-art transcoder function. In this example, a stream that was previously encoded using MPEG-4, is converted to an MPEG-2 stream. This type of conversion can be useful during the process of upgrading a system from MPEG-2 to a more efficient compression standard such as MPEG-4 Part 10 (H.264). If the source content is made available in the MPEG-4 format, then the transcoder in FIG. 9 could be used when the content is to be delivered to a user which has not yet replaced his MPEG-2 receiver with an MPEG-4 receiver.

MPEG-4 Decode module 910 receives the MPEG-4 signal and reconstructs the uncompressed video pixels. This uncompressed stream of video pixels is then supplied to MPEG-2 encoder 920 which is adapted to receive quantization parameters from an external Control interface, and Decision Data directly from MPEG-4 Decode module 910. Decision Data can include block encoding parameters such as prediction mode, interlace mode, motion type, and motion vectors. If this information is supplied directly from MPEG-4 Decode module 910, then the complexity of the MPEG-2 encoder can be significantly reduced. However, since the encoding decisions used in MPEG-4 do not precisely match the coding decisions used in MPEG-2, the MPEG-4 Decode module 910 would typically be designed to provide only an approximation of the best encoding decisions to be used by the MPEG-2 encoder. These parameters can then be further optimized by MPEG-2 Encode module 920.

The description hereinabove with respect to FIG. 9 is specific to MPEG-4 to MPEG-2 transcoding. Those of ordinary skill in the art will immediately understand that other types of transcoding are known in the art and can be readily substituted. It is fully within the spirit and scope of the present inventive technique to do so.

Figure 10:
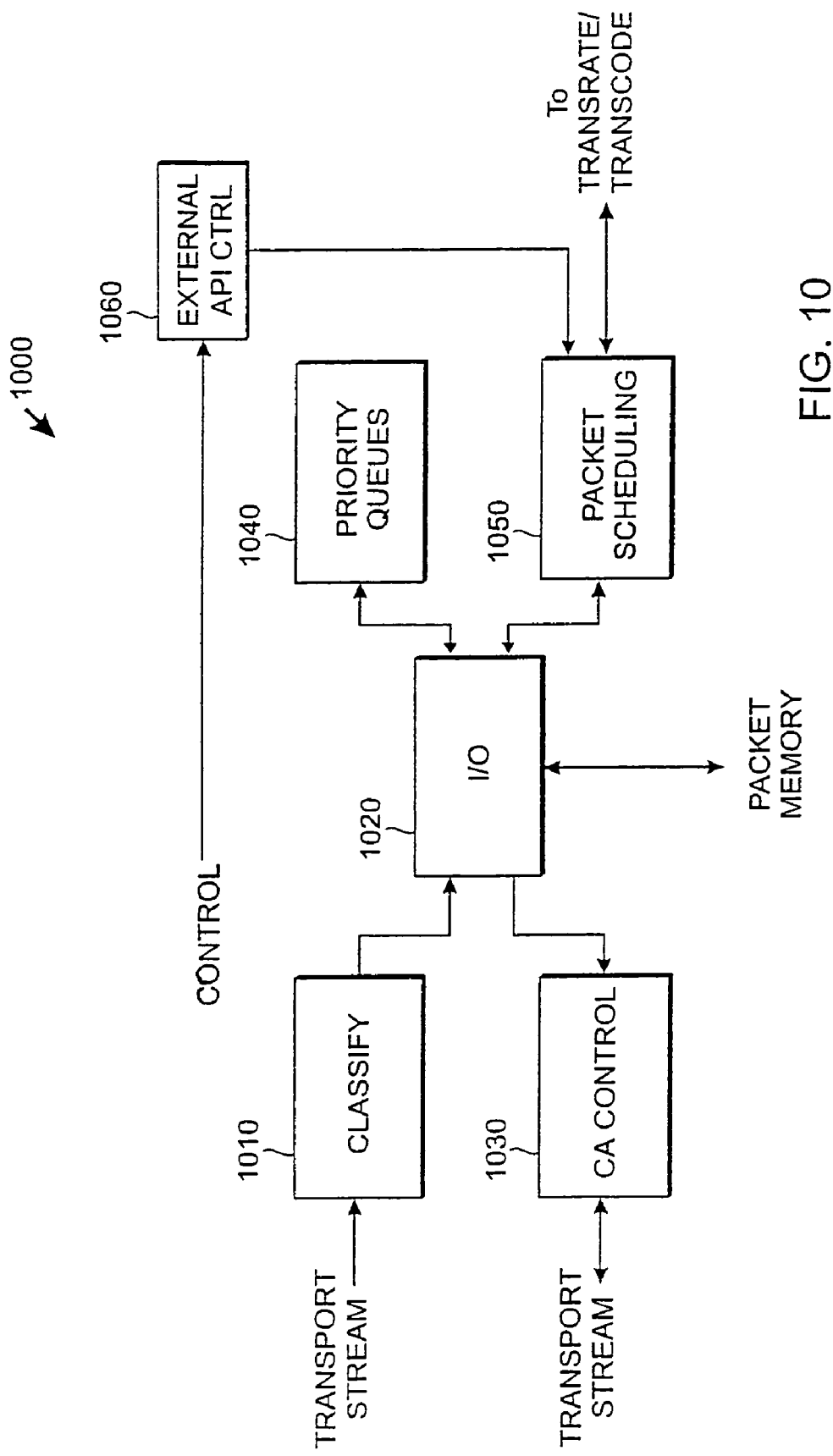
FIG. 10 is a block diagram showing software functions associated with the integrated multiplexer-modulator function of FIG. 7, in accordance with the present invention.

FIG. 10 is a block diagram of multiplexer software functions performed by the multiplexer CPU (see descriptions hereinabove with respect to FIGS. 6 and 7). These functions are described in detail in aforementioned copending PCT/US Patent Application No. PCT/US 2004/012485, incorporated herein by reference.

Classify module 1010 examines the header of each packet of the incoming transport stream before the packet is sent to I/O module 1020 and subsequently stored in packet memory. The location of each packet in memory is maintained by Priority Queue module 1040. A separate queue is maintained for each stream. The relative priority of each queue that is maintained by Priority Queue module 1040 is determined by Packet Scheduling module 1050, based on current buffer fullness levels and externally supplied stream priority or quality settings from External API Ctrl module 1060. The overall transport stream data rate can be regulated by sending video packets to a transrater or transcoder. Selected packets can also be selected for encryption by CA Control module 1030. These selected packets are retrieved from packet memory and sent to an external encrypter. Once encrypted, these packets are again returned to packet memory via Classify module 1010, and are used in place of their unencrypted counterparts. If the final transrated/transcoded and encrypted transport stream is to be sent to a modulator on the same network as the encryptor, then the output transport stream can be relayed by CA Control module 1030.

In the context of the video multiplexer system described hereinabove with respect to FIGS. 1-5, the present inventive technique does not directly address interfaces and communications between the client set-top and the server (e.g., 110, 220, 320 . . . ). However, the multiplexer can play an important role in implementing low-latency responses to client requests. Such requests include VCR "trick mode" functions like: pause, resume from pause, a change in playback speed or direction, a program change, or a jump to a different access point within the same program. In these cases, latency can be greatly reduced by coordinating the execution of the requested playback function with the flushing of excess transport packets from the memory buffers of the multiplexer, client, and server. This is particularly important in the case of statistical multiplexers which tend to utilize the full buffering capacity of both the client and the multiplexer, in order to efficiently accommodate VBR streams. Additional buffering is also used by the multiplexer to implement seamless splices to or from broadcast streams and to smooth out jitter caused by delays on the network or at the streaming server (e.g., 102, 202 . . . ).

The present inventive technique for minimizing latency at the multiplexer is now described. It is compatible with legacy and bi-directional OpenCable compliant digital set-top boxes. There is no need to modify Virtual Channel Tables once they have been created. (This is discussed in greater detail hereinbelow).

In order to minimize multiplexer delays when switching between video streams (e.g., when implementing VCR "trick modes"), specific adaptations are made to the way video data transport originating at the server is handled. To be able to minimize latency in processing client requests, the multiplexer needs additional information so that it can "get ahead of" and prepare for rapid video data switching. Specifically, the multiplexer must be able to identify the beginning of new video segments so that it may implement an immediate transition from a preceding video segment. One solution is to make the server's Stream Control Interface (CI) available to the multiplexer. In this way, the multiplexer can be made aware of VCR-like "trick mode" requests, and can be primed to execute a transition from one video segment to the next. However, if the new video segment originates from the same source address as the previous video segment, and is assigned to the same destination UDP port (User Datagram Port) on the multiplexer, then the precise transition point may still be ambiguous. For this and other reasons, an alternative solution based on in-band signaling is preferred. In this case, the multiplexer does not require access to the Stream Control Interface (CI).

To identify transition points, the server inserts identifying information at the beginning of each video segment following a request for a change in speed or direction, a resume from pause mode, or a jump to a new location in the same program or to a different program. Those of ordinary skill in the art will immediately appreciate that there are many possible ways of providing such identifying information. Preferably, transition points are identified using signaling according to the DPI Cueing Message for Cable standard (ANSI/SCTE 35). Using this strategy, each time a new video segment is sent from a server, it is preceded by a single cueing message packet. In the interest of simplicity, this packet can be standardized to a simple static format. For example, the PID (packet identifier) could be fixed, and the splice info section could include a single splice_insert command with the splice_immediate_flag set to '1'. When such a packet is received at the multiplexer, the multiplexer would respond by making a rapid transition to this new video segment. The multiplexer implements this transition by first verifying that the new video segment begins at a valid access point. If the new segment does not begin with a sequence header and I-frame, then the transition is delayed until such headers are detected. The transition is completed by flushing all buffered packets from the previous segment and implementing a clean entrance into the new video stream. This type of transition differs from the splices anticipated by the DPI standard in one important respect. In this case, a cued exit point in the first video segment is not expected. Instead, the transition is effected as soon as the cueing message packet is detected in the new video segment. For this reason, the cueing message packet should not be identical to any of the "standard" cueing messages that are currently specified by the DPI Cueing Message standard (ANSIISCTE 35). One preferred way of accomplishing this is to set the private_indicator flag in the splice_info_section of the cueing message to '1' when requesting an immediate splice where there is no need for synchronization with a marked exit point in the stream that is currently playing.

Clean entrances into the new video stream (i.e., entrances synchronized with reference frames in the new stream so that proper display of the new stream can be accomplished immediately) are important if the transitions are to be visually smooth. However, it is not necessary to implement a clean exit from the previous stream. This is because we assume that a resynchronization process is triggered at the client set-top in response to most VCR-like "trick-mode" requests. Set-tops are designed to flush their video and audio buffers when switching to a new channel frequency or when changing to a different MPEG program within the same transport multiplex. In order to minimize latency, the same response should also be triggered each time there is a request for a change in speed or direction, a resume from pause mode, or a jump to a new location in the same program or to a different program. It is assumed herein that this response can be implemented on both legacy and OpenCable compliant set-tops even though the virtual channel may remain unchanged. Alternatively, the client set-top can be forced to flush its buffers and to resynchronize to a new stream segment by forcing a switch to a different virtual channel for each "trick-mode" or similar transition. In order to maintain a static definition of the virtual channel table, the set-top can be initialized with two virtual channels allocated to each carrier frequency. These channels will be used for on-demand programming. For each pair of virtual channels, the carrier frequency would be the same, but the MPEG program number would be allowed to differ. As described in greater detail hereinbelow, for each carrier frequency, the MPEG program numbers would be uniquely assigned among all the set-tops in a single service group. Therefore, when switching from one video segment to another video segment, set-top resynchronization can be forced simply by effecting a change of virtual channel to the other virtual channel of the predefined pair at the channel frequency to which the set top is tuned. As "trick mode" effects are requested and responded to (on a given cable channel), the virtual channel would simply alternate back and forth, each time causing the set-top to resynchronize with the appropriate video stream.

Preferably, segment-to-segment splices and set-top resynchronizations are triggered in response to all VCR-like "trick mode" requests with the exception of the pause request. When a pause request is received, the server stops sending video and the set-top freezes the image (frame) that is currently being displayed by repeatedly displaying the same image frame from its internal image frame memory. When the client requests a resumption of normal playback mode, the server resumes playback with a new stream segment (forcing the set-top to resynchronize) and the multiplexer would executes a fast transition to the new stream segment. The same type of response occurs when a client requests a change in playback speed or direction, or a jump to some other program or program location.

The technique described above can be used for implementing "trick mode" requests and guaranteeing set-top resynchronization. Those of ordinary skill in the art, however, will immediately recognize that there are other possible schemes for coordinating "stream switching" that might provide more seamless or visually continuous response at the client set-top, although most of these schemes would require the exchange of additional information between the set-top and the multiplexer. This information would be needed to maintain the accuracy of the set-top buffer fullness models that are maintained in the multiplexer and used to regulate the rate of packet transmissions. It is for this reason that the technique described hereinabove (switching virtual channels and using stream cueing messages) is preferred. However, any of these techniques are fully within the spirit and scope of the present invention.

Making fast transitions from one video segment to another video segment requires coordinated flushing of buffers in the set-top, multiplexer, and server. However, once the transition is initiated, it is important to restore these buffers to normal occupancy levels as quickly as possible in order to avoid later latency problems (e.g., skips, discontinuities, pauses, etc.). If they are not restored, multiplexing efficiency will be reduced and there will be an increased risk of underflow as a result of processing; delays and network jitter.

In order to restore these buffers to optimum fullness levels quickly after a "trick mode" stream switch (or similar function), the server assigns high priority to each new video segment for a pre-determined interval. While a stream is being transmitted at high priority, it is streamed at a bit rate faster than the normal real-time rate. This faster initial burst rate should be high enough so that the multiplexer can effect a stream transition as soon as it is able to identify a suitable access point in the incoming video stream (e.g., a reference frame). While a stream is being transferred at high priority, there is little risk of a buffer underflow at the set-top due the multiplexer failing to receive video data from the server at a sufficient rate.

The priority of a new video segment can be restored to its normal, lower setting once the downstream buffers have been replenished to suitable levels. The server can determine that it has transmitted a sufficient number of bytes beyond real-time video display requirements since the time of the stream switch. This can be determined by comparing video data "accumulation" against a fixed threshold level. Alternatively, the server can measure video "acceleration" versus time. For example, if it is desirable to maintain a half second of program data in the combined multiplexer and set-top buffers, then the threshold would be met after the server has transmitted an amount of data corresponding to the video for the elapsed time interval since the stream switch plus an additional half second. Threshold detection does not need to be overly precise as long as the multiplexer has sufficient buffering capacity to accommodate any small overshoots which may occur. An advantage of this buffer management technique is that the server does not need to interact with the multiplexer. Instead, the threshold level is either a known constant or a parameter that is communicated during initialization or when a new session is created.

Another alternative technique for managing buffer occupancy levels is to implement direct flow control between the multiplexer and the server. In this case, the multiplexer not only regulates the release of video to the set-top, but would also "pull" data from the server at the precise rate needed to maintain optimum buffer occupancy levels. A disadvantage of this solution is that it requires additional flow control information passing from the multiplexer to the server, thereby presenting an additional computing load and additional network data traffic. On the other hand, an advantage is that the same flow control information that is useful for regulating buffer levels in the multiplexer can also be used to prevent buffer overflows in the port buffers of the network switch. This can become an important consideration when using unreliable protocols such as UDP, and when stream transmission rates are not well bounded. Short-term peaks in the video bit rate of one or more streams or even simple network jitter could conceivably result in the loss of packet data by the network switch. A direct flow-control scheme managed by the multiplexer could eliminate this risk entirely. However, such an end-to-end method of flow control does not scale well in large networks consisting of multiple switches or interfaces to other transport layers. In such cases, the path from the server to the multiplexer may be unknown or include too many switch buffers to be successfully managed from a single end point.

A point-to-point method of flow control, such as 802.3x, is much more capable of scaling to larger networks. 802.3x is widely incorporated in most of today's switches, routers, and the network transceivers used in common computing devices. This method of flow control is effective in preventing dropped packets in Gigabit Ethernet network switches as long as the average data rate remains below the network capacity on each link. However, to prevent unnecessary blocking, the network switch must be capable of buffering packets before they are switched to the output ports. Although 802.3x can be very effective in preventing dropped packets in the network switch, it is not intended as a solution for managing buffer level transients in the multiplexer.

The multiplexer can also implement transitions between stream segments arriving from two different IP (internet protocol) source addresses. In this case, the second stream is addressed to a different UDP port at the multiplexer.

A different multiplex is associated with each modulator channel even if the modulator and multiplexer subsystems are physically separated. During session setup, the multiplex resource manager identifies the multiplex that is best able to accommodate the new session. The IP address and port number corresponding to this multiplex is returned to the session manager and subsequently relayed to the video source.

By means of the techniques described hereinabove with respect to FIGS. 6, 7 and 8, the multiplexer is capable of transrating each video stream to match the data rate of the MPTS to the data rate of its assigned QAM channel. Transrating is performed only when the data rate cannot be matched by statistical processing alone. By default, all streams are degraded only as much as necessary to maintain uniform image quality among all streams in the multiplex. Alternatively, different priorities can be assigned to individual video streams, or the peak rates can be bounded on a stream-by-stream basis. Transrating is particularly effective when applied to CBR video streams where the aggregate input data rate exceeds the rate of the QAM channel. A conversion from constant bit rate to variable bit rate at constant image quality results in significant data rate reduction with minimal image impairment.

General-purpose data streams can be included in each multiplex and delivered in synchronization with the video and audio components, at least on a best-effort basis. Synchronization tolerances and QoS constraints can be specified during session initialization.

The multiplexer can combine broadcast and narrowcast streams into the same multiplex. Switched broadcast mode can also be supported, as well as seamless transitioning between broadcast and narrowcast modes. Similarly, DOCSIS (Data Over Cable Service Interface Specification) streams can also be combined into the same downstream channel. Depending upon specific characteristics of the multiplexer implementation, external devices may be used to format the DOCSIS transport packets for inclusion into the downstream channel.

The multiplexer can support multiple video formats such as MPEG-2, MP@ML (Main Profile at Main Level) and HDTV, and can include sufficient resources to handle any practical combination of MP@ML and HDTV streams in each modulator channel. MPEG-4/Part 10 AVC (Advanced Video Coding) may also be supported with both transrating and transcoding capabilities. With this transcoding capability of the present inventive multiplexer, it becomes possible to conserve storage resources on the server by adopting the more efficient MPEG-4 format for most high definition or standard definition content, and relying on transcoding to enable compatibility with existing MPEG-2 set-tops. This ability becomes particularly advantageous after migrating to a predominately narrowcast format, as it permits selective enabling of the transcoding feature on a client by client basis. This permits the gradual migration of clients to MPEG-4 set-tops and can have a very significant impact on the last-mile bandwidth that available for narrowcasting.

The present inventive multiplexer and multiplex resource manager subsystem is compatible with existing headend systems. With the standardization of interfaces and APIs (Application Programming Interfaces) modules may be readily interchanged.

The present inventive multiplexing system also supports existing conditional access systems. However, to permit effective transrating and transcoding, the video must be received at the multiplexer either in the clear, or in a format that is easily decrypted. For this reason, video is streamed directly to the multiplexer from the server as shown and described hereinabove with respect to FIG. 4 and FIG. 5. The multiplexer identifies the packets to be encrypted and sends these packets directly to the encrypter on its own (independent of the server and/or session manager). The video data path associated with this mode of operation is shown and described hereinabove with respect to FIG. 5. The multiplexer and encrypter subsystems can be located either the headend or at the network "edge" (i.e., at the point of modulation).

Critical packet selection using techniques similar to those developed for Sony Passage can be applied. The present inventive multiplexer can improve the efficiency of a central encrypter by combining critical packets from different streams into a single stream addressed to a single encryption channel of a central encrypter. The encrypted packets are then returned to the multiplexer where they are demultiplexed and resequenced into their original streams. EMMs (Encryption Management Messages) and ECMs (Encryption Control Messages) can be replicated as necessary, and properly sequenced with the encrypted program packets.

Transrating and transcoding are incompatible with pre-encryption unless the scrambling algorithm is open and decryption routines are implemented in the multiplexer. Transrating, transcoding, and all other multiplexing functions are compatible with session based encryption.

In order to achieve maximum benefit of the capabilities of the present inventive video multiplexer system in systems that employ encrypted conditional access (CA), encryption resources should be managed by the multiplex resource manager. The primary benefit is that most sessions can be initialized without the need for allocating additional encryption resources. Accordingly, the session manager requests resources from the multiplex resource manager before requesting additional resources from the encryption resource manager. Included in the session manager's request to the multiplexer are parameters that identify the client and the authorization tier associated with the requested program. In most cases, the multiplex resource manager will be able to accommodate the request using encryption channels that have already been created, while maintaining maximum protection against unauthorized access. However, in some cases, the acceptance of a new request will require either the allocation of a new encryption channel or a reduction in encryption security. For example, encryption security would be degraded if two or more clients within the same service group shared the same encryption channel (and therefore the same encryption keys) while viewing content corresponding to different authorization tiers. This condition may not be acceptable even though the set-tops would not be provided with the virtual channel settings needed to receive programming that is intended for other On-Demand clients. Encryption security would also be degraded if the critical packet ratio was reduced below a previously-determined safe threshold in order to accommodate an increasing number of clients sharing the resources of a single encryption channel.

When the multiplex resource manager determines that the acceptance of a new request will cause a reduction in encryption security, it responds to the session manager with a request for the allocation of a new encryption channel. Upon receiving such a response, the session manager then requests such resources directly from the encryption resource manager using interface S2 (See FIG. 5). However, if additional encryption resources are unavailable, the session manager can either deny the client's request, or allow the session to proceed with a reduced level of security. The request for a new encryption channel can occur asynchronously and without incurring a latency penalty. This is described in more detail in the following session initialization example.

The initialization management process that is presented below includes additional details for the interactions with the multiplexer and encrypter resource managers. The system topology of FIG. 5 is assumed, and references are made to data communications paths shown in FIG. 5. In this particular example, the session manager always maintains a record of the next available encryption channel. The multiplex resource manager claims this channel only when needed to fulfill the next request.

Step 1: The client sends a session setup request message to the session manager using an upstream channel within the HFC Network and Interfaces SC1 and S4. The message includes the client ID and the asset ID corresponding to the requested program.

Step 2: The session manager (or an external purchase server) checks if the client is authorized to view the requested asset by comparing the client's entitlement status with an authorization tier ID associated with the requested asset. If the session is authorized, go to Step 3, otherwise the session manager sends a session denial message to the client.

Step 3: The session manager provides the client ID, authorization tier ID, and the IP address/UDP destination port corresponding to the next available encryption channel, and requests multiplexer resources for the session from the multiplex resource manager (using interface S3—see FIGS. 1-5). The multiplex resource manager replies with the virtual channel information (tuning frequency and MPEG Program ID) for the client. If a session is already active for this client, then this information will not change unless the multiplexer chooses to rebalance traffic over the modulator network. The multiplex resource manager is also capable of working with static virtual channel maps for each client, thereby avoiding the need for constant reprogramming of the client's receiver. (This is discussed in greater detail hereinbelow).

The response message from the multiplex resource manager to the session manager also includes the multiplexer IP address/UDP destination port to be conveyed to the server, and an acknowledgement if the new encryption channel was accepted. If accepted, then an entitlement ID will be included in the reply and the multiplexer will utilize the new encryption channel by sending selected packets to the encrypter IP address/UDP port that was specified in the request. The multiplex resource manager will not accept the new encryption channel if the request can be accommodated using the encryption resources that have already been allocated. If the encryption channel is not accepted, then go to step 5.

Step 4: The session manager provides the entitlement ID to the encryption resource manager. This entitlement ID is associated with the most recently requested encryption channel. The encryption resource manager ensures that multiple encryption channels will share the same entitlement keys if they are assigned the same entitlement ID. The encryption resource manager responds with the EMM for the preceding encryption channel and the IP address/UDP destination port for the next available encryption channel. During operation, the Encryption Engine returns all encrypted packets to the IP address/UDP port corresponding to the originating source.

Step 5: The session manager provides the asset ID and the multiplexer IP address/UDP destination port to the server resource manager (S1).

Step 6: The session manager sends the session setup confirm message to the client using S4 and SC1. Alternatively, the confirmation message could be relayed to the client by the multiplexer using downstream channels (V3 and V4) within the HFC network. The confirmation message includes the virtual channel information (tuning frequency and MPEG Program ID) from step 3. In addition, if step 4 was not omitted, then the EMM is also included in this message.

The multiplex resource manager handles session teardown automatically. Typically, a new session request will utilize the same multiplexer, modulator, and encrypter resources as a preceding session, and therefore the number of session set-up and tear-down requests is minimized. If there is a change in the assignment of multiplexer or modulator resources, then this will be handled automatically by the multiplex resource manager and will not require communication with other resource managers. If a client chooses to view a different asset while the current session is still active, then the client merely needs to repeat step 1. Alternatively, if a client chooses to terminate an existing session and does not desire a new session, then the multiplex resource manager is notified. In some cases, this will cause selected resources to be released so that they can be reassigned to accommodate other requests.

Occasionally, the multiplex resource manager will determine that a particular encryption channel is no longer needed. In this case, it sends a message to the session manager using S3, which the session manager forwards to the encryption resource manager using S2. One way to identify the encryption channel that is being released is to reference the IP address/UDP port that was assigned for receiving incoming packets arriving at the encryption engine.

The present inventive multiplexer and encryption subsystem architecture offers several performance advantages. The number of video and audio streams that can be accommodated by the encryption engine (encrypter) is increased by a factor of at least 10 over traditional, less resource-efficient approaches). In addition, the session setup and tear-down processes completely bypass the encryption resource manager in almost all cases. A statistical multiplexer with transrating capabilities eliminates the risk of overflowing the QAM channel even if the channel is intentionally oversubscribed. For example, one could allocate 11 or more CBR video programs, each with a data rate of 3.75 Mb/s, to a single 256 QAM channel. Through the selective use of transrating, the statistical multiplexer can convert each stream from constant bit rate to constant image quality, thereby achieving a significant reduction in data rate with minimal image impairment.

The present inventive multiplexer is also able to significantly reduce the latency associated with both session setup and client requests for playback mode modifications such as VCR-like "trick modes". Accommodation of such modes is described hereinabove. In addition, the session setup delays that are associated with encryption can be eliminated entirely. In most cases, the client remains in the same encryption channel even when requesting access to programming that is associated with a different authorization tier. In such cases, there is no need to send new EMMs or to alter the flow of ECMs to the client's receiver. In other cases, the multiplexer may need to transition a stream from one encryption channel to another encryption channel, and this transition may also involve a change in the entitlement status of the client's set-top. Even in such cases, the multiplexer can ensure that the transition is seamless, and delays due to encryption and entitlement are avoided. The multiplexer can choose to send the initial stream of packets in the clear in order to allow time for the set-top to process the first ECM, as well as any changes in entitlement. This momentary loss of access protection at the multiplexer is not a significant concern since the session manager (or external purchase server) will reject any request from a client that is not properly authorized, and this will cause session cancellation before any requests are sent to either the video server or the multiplexer.

Variable bit rate (VBR) encoding offers several advantages. The improvement in compression efficiency is approximately 40 percent when compared to constant bit rate (CBR) programming of the same perceived image quality. In such a comparison, the CBR content may deliver higher quality on average; however, this is of no practical benefit when comparative image quality during more active scenes (i.e., when image compression becomes more challenging) is considered. The encoded CBR content will exhibit higher distortion levels at these times, and the degradation can be very noticeable when compared to VBR content encoded at the same average bit rate.

The improved efficiency achieved by using VBR encoding has a direct impact on the cost of video storage systems, the amount of network traffic, and the number of streams that can be accommodated over the "last mile" network. This increased capacity can also be traded for higher quality video such as HDTV programming.

Compatibility with VBR content is also important when capturing programming from satellite sources. Today, most satellite programming is generated using statistically multiplexed VBR encoders. If a video architecture does not support VBR streams, then a VBR to CBR conversion process is required, either by increasing the bit rate with the insertion of null packets, or by degrading the video with the application of a transrating process.

Compatibility with existing satellite programming is also important for support of Switched Broadcast. In such cases, VBR streams are selectively removed from a broadcast multiplex, and replaced with on-demand streams. In order to avoid significant image degradation, the entire multiplex can be regenerated using transraters and a statistical remultiplexer.

DVDs also use VBR encoding, and compatibility with DVD content may be important for VOD systems, since DVDs are an important source of encoded material. Transrating DVD content to a given VBR rate would preserve better image quality than transrating it to CBR at the same average rate.

Supporting VBR programming may complicate some server implementations. A server that is designed to stream video at a constant rate may require modifications before it can stream video at the actual real-time transmission rate. The timing information needed for proper synchronization is easily extracted from the time stamps and PCRs that are embedded in each program; alternatively the multiplexer could pull streams from the server using a flow control mechanism, in which case the server would actually be simplified.

The presence of VBR streams can also complicate the provisioning of resources. For example, the number of VBR streams that can be sourced by a server may vary from one time instant to the next. The solution to this problem involves a good load balancing strategy applied across multiple storage devices. Similarly, network congestion due to traffic between the server and the multiplexer also becomes more difficult to predict and to control. In this case, the simplest solution is to overprovision the network in order to satisfy worst case conditions. This additional networking cost should be negligible if the multiplexers are colocated with the servers.

Although full VBR functionality can be supported today, it may be difficult to justify the benefits given the current cost of transrating products. However, we believe that a multiplexer product can be produced without incurring a cost penalty for statistical transrating capabilities. Such a product could be used advantageously even if the source content exists in a CBR format. Through the selective use of transrating, the multiplexer can convert each stream from constant bit rate to constant image quality, thereby achieving a significant reduction in data rate with minimal image impairment. This results in additional bandwidth that can be used to accommodate additional CBR streams. Alternatively, the streams could be delivered to the multiplexer at a higher CBR rate, thereby realizing an improvement in video quality.

Encryption channel management by the multiplex resource manager enables the use of real-time encryption at a very low cost. Compared to the pre-encryption alternative, real-time encryption offers improved security, supports more flexible key management policies, does not bind the content to a single CA system, can be applied to programming received from satellite or real-time encoders, and does not prevent the application of transrating, transcoding, or seamless splicing operations. If necessary, the multiplexer could include support for some form of content encryption during distribution from the head-end source to the multiplexer and real-time encryption engine. In this case, the multiplexer would first decrypt the content before performing any other processing.

Low cost real-time encryption is achieved by using a critical packet selection scheme similar to the packet selection methods used in Sony Passage systems. According to Sony, studies have concluded that there is a negligible loss in access protection when the critical packet selection rate is 10% or more. The multiplexer can improve the efficiency of a central encrypter by combining critical packets from different streams into a single stream that is addressed to a single encryption channel of the central encrypter. The encrypted packets are then returned to the multiplexer where they are demultiplexed and resequenced into their original streams. EMMs and ECMs can be replicated if necessary, and properly sequenced with the encrypted program packets.

One consequence of multiplexed encryption is that each of the clients whose streams are assigned to the same encryption channel will receive the same ECMs, and therefore each client set-top must be similarly authorized in order to decode them. However, by careful selection of the streams that are assigned to each encryption channel, the multiplex resource manager can eliminate the risk of a client gaining unauthorized access to the content that is intended for another client. Two types of encryption channels can be created to deal with this potential problem. The multiplex resource manager can assign packets to the first type of encryption channel only if the corresponding streams are all associated with a same authorization tier. In this case, each client has little incentive to apply his keys to another client's stream since he would not be gaining access to anything that he is not already entitled to receive.

If a client is assigned to a single-tier encryption channel, and this client subsequently chooses to view a program that is associated with a different authorization tier, then the client must be removed from this encryption channel and reassigned to another. In some cases, this will also require the authorization of the client's set-top in order to gain access to the new authorization tier. As discussed hereinabove, this transitioning of a client from one encryption channel to another can be implemented seamlessly without introducing any delays due to the session authorization process.

The multiplex resource manager can also create and manage a different type of encryption channel where each of the assigned streams is targeted to clients in physically separated service groups. In this case, the packets of the multiplexed and encrypted packet stream are regrouped into multi-program transport streams that are subsequently distributed to different service groups. This means that each client will have no way to apply his keys to another client's stream simply because these streams will not be available on the same feed. Once assigned to this type of encryption channel, a client will not need to be reassigned when switching from one program to another, even though the corresponding authorization tiers may differ. In fact, a client may only need to be reassigned if part of a rebalancing operation designed to avoid the over-utilization of any single encryption channel. Rebalancing can be performed seamlessly without incurring any sort of service disruption.

The modularized video multiplexing systems shown and described hereinabove in FIGS. 3, 4, and 5 may span one or more cable headends and several edge devices distributed over a large metropolitan-area network. Managing local-area or metropolitan-area networks introduces complexity, which must be justified by benefits. Excessive complexity is a real risk in deploying new services.

LAN bandwidth, on a per-video-stream basis, is extremely cheap compared to other costs in the VOD chain. Simply overprovisioning the LAN may be the most straightforward and least risky course. Metro networks involving fiber and DWDM (Dense Wavelength Division Multiplexing) are not quite so cheap, but if they carry CBR traffic (such as complete video multiplexes destined for "passive" modulators at the edge), then management is as simple as adding up the total traffic in the high-level provisioning control plane; no QoS intelligence in the network infrastructure is needed for this. For VBR traffic (such as in SPTSs when video multiplexing/transrating occurs at the edge), a fixed fractional overhead can offer acceptably low probability of oversubscription.

Interfaces for QoS and "traffic management" are well known to those of ordinary skill in the art, both for IP networking (e.g. Diffserv (differentiated services), PHBs (per-hop behavior)) and for ATM (Asynchronous Transfer Mode). Generally speaking, the operational complexity and added cost of these features (especially for ATM, which has essentially priced itself out of the market for all but legacy telecom applications) is unlikely to justify any savings in network capacity.

For "next generation" video systems, it is assumed herein that the traditional "edge" multiplexer/modulator device has been partitioned into distinct multiplexer and modulator components as shown in FIG. 5. A primary motivation for this partitioning is to facilitate the option of relocating the multiplexer from the network edge to the headend. However, when components of next generation video systems are colocated, it may be advantageous to offer some of these components as integrated units, particularly if this merging of components leads to lower costs, reduced space, and lower power consumption. Once this integration causes an interface to become internalized, compliance with interface specifications that would otherwise exist between separate devices is not essential provided that external interfaces and communications remain unaffected.

Referring once again to FIG. 5, interface S2 between the session manager and the encryption resource manager is used to reserve new encryption channels or to tear down existing ones. An example of how a new channel might be reserved was described in step 4 of the process described hereinabove. In this example, the session manager communicates an entitlement-ID to the encryption resource manager, which then responds with an EMM to be used for client authorization, and an IP address/UDP port to be forwarded to the multiplex resource manager. This port is the network address where packets are to be sent for encryption. The encryption resource manager should also ensure that multiple encryption channels will share the same EMMs and ECMs if the channels are requested using identical entitlement-ID parameters.

The session tear-down process was also described hereinabove. The multiplex resource manager determines when an encryption channel is no longer needed and communicates this information to the session manager. The session manager then forwards this message to the encryption resource manager using S2. The tear-down message merely needs to identify the encryption channel that is no longer needed.

The following information should be included in the session set-up message communicated on S3:

client ID: used by the multiplex resource manager in order to uniquely identify each client. A mechanism must also be provided to specify if the session is to be multicasted to more than one client or broadcasted to one or more service groups. For example, reserved bits of the client ID codeword may be used to signal broadcast mode. Alternatively, the client ID could include a network mask in order to specify multiple subnets.

Authorization Tier: this is an authorization classification that is associated with the requested asset and is used by the multiplex resource manager when assigning streams to encryption channels based on the single-tier policy.

IP address/UDP port (encryption): the address of the next available encryption channel. It is to be used only if the multiplex resource manager cannot identify an existing encryption channel to accommodate the request while still meeting the minimum security requirement. A codeword may be reserved to indicate that no additional encryption channels are available.

QoS: specifies the channel priority to be assigned for this request. It is used by the multiplex resource manager when selecting an MPTS to accommodate the request and when managing the application of transrating once the selected modulator channel becomes fully utilized. Transrating can be controlled by including a relative stream priority or maximum/minimum bit rates as part of the QoS specification.

Time: can be used to specify the session start time or to signal the use of DPI cueing messages.

The response to the session setup message on Interface S3 should include the following information:

Virtual channel ID: This information may include the tuning frequency and MPEG Program ID needed by the client's set-top to receive the MPTS and to identify the assigned MPEG program. Alternatively, the multiplex resource manager could be synchronized with the Virtual Channel Table (VCT) of each client's set-top, and in this case, only the VCT ID needs to be returned. This enables the use of static VCT tables and avoids additional delays due to set-top reprogramming.

IP address/UDP port (input): the address that has been assigned to receive packets for this program. It is to be forwarded to the server.

Entitlement ID: if the offered encryption channel was accepted, then this parameter should be forwarded to the Encryption Resource manager. If the Encryption Resource manager subsequently determines that the entitlement ID was previously bound to one or more existing encryption channels, then the new channel should share the same EMM and ECMs as the previous channel(s). Otherwise, the new channel should be associated with independent EMM and ECM messages. A reserved codeword can be used to indicate that the offered encryption channel was not accepted by the multiplex resource manager. If an additional encryption channel was not available and therefore not offered to the multiplex resource manager, and if the request could not be accommodated while meeting the minimum security requirement, then this must be signaled as well.

Although the minimum security requirement parameter should also be specified to the multiplex resource manager, this may be done during initialization and need not be repeated each time a session setup message is exchanged.

If a session is to be terminated and if the client will no longer be active, the server can simply stop sending packets to the identified input IP address/UDP port. Alternatively, explicit session termination message which references the client-id could be sent from the session manager to the multiplex resource manager. Finally, it is not necessary to terminate sessions when clients switch from one program to another. The multiplex resource manager can implement a seamless low-latency transition when the next session set-up message is received.

Since the modulator channel is assigned by the multiplex resource manager, the session set-up message does not need to involve the modulator. However, if the multiplexer and modulator are separate devices, then the multiplex resource manager must be aware of the destination IP address and UDP port assignments corresponding to each modulator channel, and the correspondence between modulator channels, service groups, and clients. This information should be gathered during the initialization process and updated from time to time as changes occur. This client initialization and auto-discovery process is described in more detail hereinbelow.

A suitable choice for the transport interface sourced by the server (Interface V1) is raw UDP/IP over a Gigabit Ethernet physical link. One to seven MPEG transport packets can follow the UDP header, formatted as an SPTS according to the ISO/TEC 13818-1 MPEG transport specification. RTP headers are optional.

A suitable choice for the transport interface sourced by the encrypter (Interface V2) is raw UDP/IP over a Gigabit Ethernet physical link. One to seven MPEG transport packets can follow the UDP header, formatted as an SPTS according to the ISO/IEC 13818-1 MPEG transport specification. RTP headers are optional.

A suitable choice for the transport interface sourced by the multiplexer (Interface V3) is raw UDP/IP over a Gigabit Ethernet physical link. One to seven MPEG transport packets, formatted as an MPTS according to the ISO/TEC 13818-1 MPEG transport specification, can follow the UDP header. Although RTP headers are acceptable, they are not useful to the multiplexer, since transport packets must still be checked for the presence of PCRs (Program Clock Reference). The PCRs are necessary for individualized synchronization with the time base that is associated with each MPEG program.

A suitable choice for the transport interface sourced by the modulator (Interface V4) are MPTS's over fiber or coax with 6 Mhz or 8 Mhz FDM channelization. Each MPTS should be compliant with ISO/IEC 13818-1 as well as applicable DOCSIS specifications.

The client auto-discovery process is assisted by the multiplexer, which can insert network-id and transport-stream-id parameters into each multiplex. During initialization, the multiplex resource manager learns the network address of each modulator channel (unless the multiplexer and modulator are integrated into the same device) and the channel frequencies and service groups associated with each modulator channel. The multiplex resource manager must also determine which clients are included in each service group. All of this information can be determined automatically if the client's set-top can be programmed to extract the network-id and transport-stream-id parameters from the downstream channels and echo this information back to the multiplex resource manager using an upstream channel within the HFC Network and Interfaces SC1, S4, and S3.

As described hereinabove, the multiplex resource manager is compatible with static Virtual Channel Table (VCT) assignments at the client. This avoids the need for constant reprogramming of the client's set-top and the associated delays during session set-up. In this case, the VCT should be constrained in order to contain at least one entry for each modulator frequency that is managed by the multiplex resource manager. The entry should also specify an MPEG Program ID that is not shared by any other client set-tops within the same service group when tuned to the same frequency.

Since the present inventive multiplexer, encrypter, and modulator subsystems are designed and optimized for Networked PVR applications, no additional modifications are required. Together, these subsystems are well-suited to applications requiring a large number of simultaneous sessions, real-time encryption, minimal setup and tear-down signaling, fast transitions from one session to another session, and rapid response to client requests for VCR-like "trick mode" functions. Switching between broadcast and on-demand sessions can also be performed seamlessly as described hereinabove.

To minimize complications in server and asset management subsystems, on-demand capabilities should be disallowed while viewing broadcast content unless the asset is already registered and in the process of being captured (i.e., recorded to disk or other storage medium). In this case, it is advantageous to use the captured content as the source for the broadcast signal. Although a slight loop-through delay would be introduced, the transitioning of one or more clients to on-demand mode could then be implemented seamlessly and access to the entire recording could be made available at that time.

Figure 11:
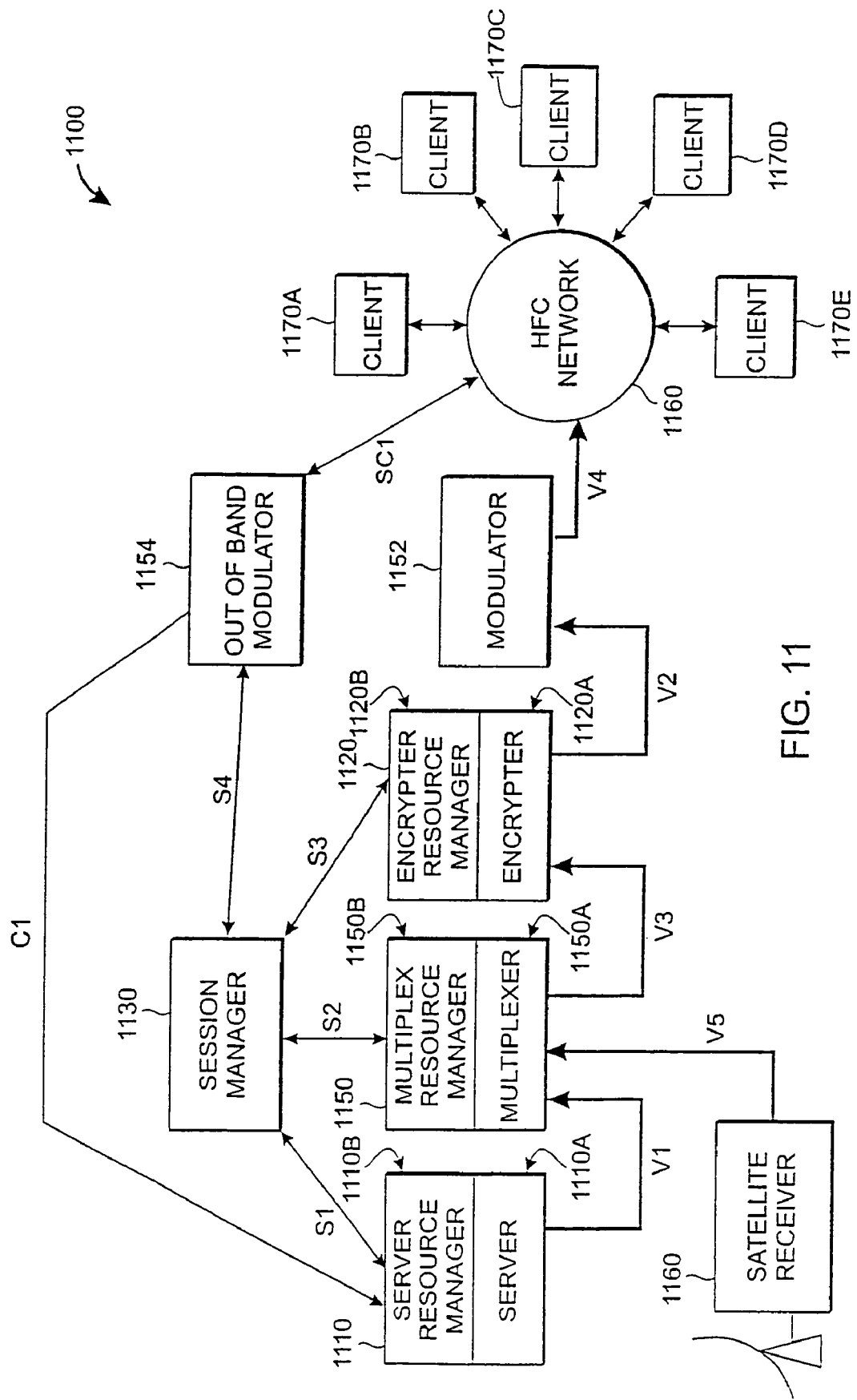
FIG. 11 is a block diagram of another embodiment of a video multiplexer system employing a satellite receiver, in accordance with the present invention.

FIG. 11 is a block diagram of a video multiplexer system 1100 similar to that previously shown and described hereinabove with respect to FIG. 4. The video multiplexer system 1100 of FIG. 11 accommodates this scheme for a satellite receiver.

Like the system 400 of FIG. 4, the system 1100 of FIG. 11 embodies comparable elements: a server module 1110 (compare 410) comprising a server 1110A and a server resource manager 1110B; an encrypter module 1120 (compare 420) comprising an encrypter 1120A and an encrypter resource manager 1120B; a session manager 1130 (compare 430); a multiplexer module 1150 (compare 450) comprising a multiplexer 1150A and a multiplexer resource manager 1150B; a modulator 1152 (compare 452) and an out-of-band modulator 1154 (compare 454). As in the system 400 of FIG. 4, the elements of the system 1100 are interconnected by any suitable means, such as in a locally networked configuration as shown in FIGS. 1 and 2. The modulator 1152 and out-of-band modulator 1154 connect to a "last mile" network 1160 (compare 160, 260, 360, etc.) shown in the Figure as an HFC network. A plurality of clients 1170A, 1170B, 1170C, 1170D and 1170E (compare 170A-E, 270A-E, 370A-E, etc.) connect to the "last mile" network 1160 and communicate via the modulator 1152 and out-of-band modulator 1154.

In FIG. 11, various data communications paths are shown. As before, data communications paths "S1", "S2", "S3" and "S4" are session communications paths controlled by the session manager; data communications paths "V1", "V2", "V3" and "V4" are video/audio communications paths over which program content is passed; data communications path "C1" is a client communications path between the server resource manager 1150B and the various clients 1170'x'; and data communications path "SC1" is a composite of session communications S4 and client communications C1 directed through the out-of-band modulator 1154 over the HFC network 1160 for communications with the clients 1170'x'. In addition, the multiplexer 1150A receives video stream data from a satellite receiver 1160 over a data communication path "V5".

The communications dataflow in FIG. 11 differs only from that of FIG. 4 in the addition of the satellite receiver 1160 and its associated video datapath V5.

The present inventive multiplexer subsystem supports Interactive Digital Program Insertion. Splices can be signaled according to ANSI/SCTE 30/35 DPI standards. Program exit and entrance points can be defined in both live and stored streams, either of which may be broadcasted or narrowcasted from any network source address. The splices are implemented seamlessly and accurately and can be scheduled at any time, either with or without cueing messages. Transrating eliminates the risk of exceeding modulator channel capacity, even when splicing to a higher rate stream or when the splice point has not been conditioned using fade-to-black or other rate-reduction effects. Statistical rate management policies are used to achieve the best image quality balance among all programs, while adhering to previously-applied QoS constraints.

To support switched broadcast, entire broadcast multiplexes can be sent to the multiplexer without unpacking the individual programs into single program transport streams. For example, the Satellite Receiver shown in FIG. 11 can provide MPTSs directly to the multiplexer using interface V5. Although the multiplexer can support MPTSs just as easily as SPTSs, this requires the inclusion of additional information in the session setup API that is communicated using Interface S2 between the session manager and the multiplex resource manager. Specifically, the session manager must specify to the multiplex resource manager which MPEG programs of the MPTS are to be forwarded to the destination, or alternatively, which programs are to be deleted. The session manager must also inform the multiplex resource manager each time a decision is made to drop an additional program or to reinstate a program back into the multiplex.

As programs are dropped and additional bandwidth becomes available, the multiplex resource manager can automatically introduce on-demand programming into the multiplex in order to better utilize the available bandwidth. As described hereinabove, new streams can be provided to the client with very little latency.

In providing streaming media services to PCs and other devices over DOCSIS, the video content could be sent either natively in the MPEG-TS sublayer or encapsulated in IP according to the DOCSIS MAC layer. Existing cable modems (CMs) would not bridge the native MPEG-TS packets onto the home network, so in the interest of reverse-compatibility, the use of IP is preferred, perhaps using well-known multicast addresses.

A converged video and DOCSIS infrastructure would eliminate the distinction between video QAMs and DOCSIS QAMs, in which case video data could be migrated over to an IP format on a user-by user basis. The users could view the content either on a PC or on a video-enabled CM (or both). Moving away from legacy set-tops and toward simple DOCSIS/IP-based video endpoints would result in significant cost savings. In this scenario (converged video/DOCSIS), since the content would already be stored at the headend in MPEG-2 or MPEG-4/Part 10 format, it could be sent as-is to the PC or CM; it would seem to be disadvantageous to store additional copies in the proprietary, closed formats commonly seen on the Internet. Content selection could be accomplished via an HTTP front-end to the headend infrastructure; playback control could again be HTTP or some other form of RPC. Headend services could be modularized to allow this to happen cleanly, much as web services are partitioned into HTTP-centric front ends and database-centric back ends.

When processing many QAM signals in a multi-channel modulator DSP environment, dynamic range, crest factor, and clipping are important considerations. Correlations in the data across QAM channels can introduce stress into the IFFT processor (e.g., 770), since a nominal IFFT scaling will be optimized for near-Gaussian signals—coherent data will cause the IFFT to overflow or clip.

Most MPEG payload data is relatively uncorrelated across channels, but if FEC (Forward Error Correction) frames are aligned across channels, the FEC headers themselves can introduce correlations. One solution is to offset the symbol streams from one another post-trellis coding by delaying each QAM channel a different number of QAM symbols. An offset of eight QAM symbols per channel (so that channel 0 is delayed 0 by symbols, channel 1 is delayed by 8 symbols, channel 2 is delayed by 16 symbols, etc.) is sufficient to remove all such cross-channel correlations.

It seems likely that the most cost-effective storage systems will be block-based and distributed. Serving a given video stream entirely from one server node does not allow good system-wide load balancing, and it results in inefficient RAID (Redundant Array of Inexpensive Drives) schemes. Distributed dynamic RAID across all storage nodes offers an improved level of robustness at the lowest cost.

The "streaming" function, that is, emitting video bits at the correct average rate, is currently handled by the servers. It could instead be handled by the video multiplexer, since the multiplexer is the natural aggregation point for content contributions from all storage nodes. The multiplexer could implement the RAID scheme and interoperate with a distributed filesystem.

For networking, 10 G (10 Gigabit Ethernet) is the clear choice for LAN (Local Area Network) and MAN (Metro Area Network) as soon as it hits cost parity with 1 G (1 Gigabit Ethernet). 10 G is a natural convergence point for Ethernet and SONET, so legacy SONET installations can transition to the more cost-effective Ethernet. Centralized installations with system radii under 50 meters or so will be able to use 10 G/copper with even greater cost savings.

The last-mile network is currently a hybrid of analog and digital signals channelized at 6 MHz. While the channelization is an artifact of the legacy terrestrial FDM (Frequency Division Multiplexed) analog television system, it is probably useful even in an all-digital scenario to control receiver cost, at least until individual users require services at greater than 40 Mb/s.

It will soon become cost-effective to transition to an all-digital last mile. "Micro-set-tops" or "converters" from digital to analog RF will quickly pay for themselves, given the high-value services that will use the harvested bandwidth, and in high volume will be very cheap. Moreover, the modulators to supply the waveforms for these many additional digital channels can be implemented very inexpensively using DSP techniques and highsample-rate, high-fidelity DACs. A typical modulator might accept a 1 OG feed and produce two RF outputs each with 128 QAM channels; several such modulators could fit in a single rack unit and a-100 W power budget, even with today's technology.

Finally, it seems likely that video and DOCSIS will converge. The downstream PHYs are identical, and there is a convergence sublayer in the form of MPEG-TS. Current CMTSs bind downstream and upstream MAC processing rather tightly, but the DOCSIS protocol itself doesn't preclude "split" implementations in which a downstream box handles all the downstream (including video content), an upstream box handles all the upstream, and MAC processing and the link to IP occurs in some third box sitting on the network. Timing requirements could be handled by high-resolution timestamps prepended to the MAC fragments, both up and down; it is easy to distribute accurate time, even over wide areas.

The present inventive technique is frequently described hereinbelow in the context of digital cable television systems. However, those of ordinary skill in the art will understand that with appropriate, minor adaptations, the invention can also be applied to other video distribution systems such as telephone distributions networks comprising network switching gear at the central office and fiber or twisted pair cabling from the central office to the home. In some cases, telephone companies may offer video services using similar 6 MHz or 8 MHz channelization of the frequency spectrum, and therefore will specify modulator devices which may be identical to the cable system counterparts. In other cases, the modulator will be replaced by a DSLAM (Digital Subscriber Line Access multiplexer) or some other device more capable of maximizing the data throughput over the last mile physical link. In such cases, it is only the modulator component of the video distribution system that is replaced. The multiplexer, which is where the present inventive techniques are realized, will remain essentially unchanged.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method of initializing a client session in a video multiplexer system, comprising:

sending a client session setup request message for specific video program content from a client device to a session manager, said message including a client ID and an asset ID associated with said specific video program content;

determining if the client device is authorized to receive the specific video program content by comparing an entitlement status for the requesting client device with an authorization tier ID associated with an authorization tier for the specific video program content;

sending a session denial message to the requesting client device if the requesting client device is not authorized; and if the requesting client device is authorized, performing the further steps of:

determining a virtual channel and associated virtual channel ID for providing the requested specific video content to the requesting client device;

assigning a pre-existing encryption channel for the session if the pre-existing encryption channel is compatible with encryption requirements of the session, wherein the encryption requirements comprise a specific set of encryption parameters associated with the authorization tier for the specific video program content, other establishing a new encryption channel for the session; and sending an entitlement management message (EMM) for the session to the requesting client device; and sending a session confirmation message including the virtual channel ID to the requesting client device.

2. A method according to claim 1, wherein the video multiplexer system comprises a session manager;

a plurality of client devices;

a video server responsive to said session manager;

a multiplexer;

encrypter means for encrypting digital video content; and at least one transrating module.

3. A method in accordance with claim 2, wherein a new client session setup request utilizes the multiplexer and encrypter means used by a preceding session.

4. A method according to claim 1, wherein the step of assigning a pre-existing encryption channel for the session if a compatible pre-existing encryption channel is available comprises:
- providing a next available encryption channel to a multiplexer;
- determining if session encryption can be accomplished using one or more previously allocated encryption channels;
- if session encryption can be accomplished using said one or more previously allocated encryption channels, selecting one of said one or more previously allocated encryption channels for session encryption and obtaining the EMM and identifying information for the selected channel.

5. A method in accordance with claim 1, wherein said establishing of a new encryption channel comprises:
- allocating a new encryption channel for session encryption and obtaining the EMM and identifying information for the new channel.

6. A method according to claim 1, further comprising:
- providing an entitlement ID associated with the new encryption channel to an encryption manager, wherein the encryption manager assigns identical entitlement keys to encryption channels with identical entitlement IDs.

7. A method according to claim 1, further comprising:
- grouping sessions into encryption channels by service group.

8. A method according to claim 1, further comprising:
- grouping sessions into encryption channels by authorization tier.

9. A method according to claim 1, wherein a new encryption channel is established if the assignment of a pre-existing encryption channel would result in reduced encryption security.

10. A method according to claim 9, wherein, if a new encryption channel is required but unavailable:
- determining whether to allow the session to proceed with a reduced level of security or to send the session denial message to the requesting client device.

11. A method according to claim 1, wherein the client device remains in the same encryption channel when requesting access to new video program content that is associated with a different authorization tier than that of the specific video program content of the session setup request message.

12. A method according to claim 1, further comprising:
- transitioning a client device from one encryption channel to another encryption channel when requesting access to new video program content that is associated with a different authorization tier than that of the specific video program content of the session setup request message.

13. A method according to claim 12, further comprising:
- changing the entitlement status of the client device.

14. A method according to claim 12, wherein an initial stream of packets of the new video program content is sent in an unencrypted state to allow for a seamless transition between said encryption channels.

* * * * *

UNITED STATES PATENT AND TRADEMARK OFFICE
CERTIFICATE OF CORRECTION

| | | |
|---|---|---|
| PATENT NO. | : 7,864,808 B2 | Page 1 of 1 |
| APPLICATION NO. | : 12/319629 | |
| DATED | : January 4, 2011 | |
| INVENTOR(S) | : Krause et al. | |

It is certified that error appears in the above-identified patent and that said Letters Patent is hereby corrected as shown below:

Column 32, line 53: "other" should read --otherwise--

Signed and Sealed this

Twenty-second Day of February, 2011

David J. Kappos
*Director of the United States Patent and Trademark Office*